(12) United States Patent
Ichimura

(10) Patent No.: US 11,991,473 B2
(45) Date of Patent: May 21, 2024

(54) TRANSMITTING APPARATUS, TRANSMISSION METHOD, RECEIVING APPARATUS, AND RECEPTION METHOD

(71) Applicant: SONY CORPORATION, Tokyo (JP)

(72) Inventor: Gen Ichimura, Tokyo (JP)

(73) Assignee: SONY CORPORATION, Tokyo (JP)

(*) Notice: Subject to any disclaimer, the term of this patent is extended or adjusted under 35 U.S.C. 154(b) by 551 days.

(21) Appl. No.: 17/259,246

(22) PCT Filed: Aug. 9, 2019

(86) PCT No.: PCT/JP2019/031547
§ 371 (c)(1),
(2) Date: Jan. 11, 2021

(87) PCT Pub. No.: WO2020/045044
PCT Pub. Date: Mar. 5, 2020

(65) Prior Publication Data
US 2021/0297627 A1    Sep. 23, 2021

(30) Foreign Application Priority Data

Aug. 30, 2018  (JP) .................................. 2018-162146

(51) Int. Cl.
*H04N 7/035*    (2006.01)
*H04N 5/60*    (2006.01)
(Continued)

(52) U.S. Cl.
CPC ............. *H04N 7/035* (2013.01); *H04N 5/602* (2013.01); *H04N 5/607* (2013.01); *H04N 7/08* (2013.01);
(Continued)

(58) Field of Classification Search
CPC ........ H04N 5/602; H04N 7/035; H04N 5/607; H04N 21/4131; H04N 21/439;
(Continued)

(56) References Cited

U.S. PATENT DOCUMENTS 10,013,857 B2    7/2018  Sridhara et al.
2004/0183690 A1  9/2004  Nakagawa
(Continued)

FOREIGN PATENT DOCUMENTS

CN    104012098 A    8/2014
CN    107256702 A    10/2017
(Continued)

OTHER PUBLICATIONS

Jeha Ryu et al., Haptic Movie system and Service Scenario for MPEG-V, International Organization for Standardization, Coding of Moving Pictures and Audio, ISO/IEC JTC 1/SC 29/WG 11, m16440, Apr. 2009, pp. 1-10, Maui, USA.
(Continued)

*Primary Examiner* — Melur Ramakrishnaiah
(74) *Attorney, Agent, or Firm* — Paratus Law Group, PLLC

(57) ABSTRACT

Tactile vibration signals are transferred favorably in synchronization with audio signals. Transfer signals for respective blocks each including a plurality of frames are sequentially transmitted to a receiver side via a predetermined transfer line. The transfer signals include a predetermined number of channels of audio signals and a predetermined number of channels of tactile vibration signals. For example, the tactile vibration signals are generated on the basis of media signals associated with the audio signals. For example, configuration information of the predetermined
(Continued)

number of channels of audio signals and the predetermined number of channels of tactile vibration signals is added to the transfer signals.

18 Claims, 26 Drawing Sheets

(51) Int. Cl.
| | |
|---|---|
| *H04N 7/08* | (2006.01) |
| *H04N 7/10* | (2006.01) |
| *H04N 21/236* | (2011.01) |
| *H04N 21/436* | (2011.01) |
| *H04N 21/439* | (2011.01) |

(52) U.S. Cl.
CPC ......... *H04N 7/10* (2013.01); *H04N 21/23614* (2013.01); *H04N 21/436* (2013.01); *H04N 21/439* (2013.01)

(58) Field of Classification Search
CPC .. H04N 21/436; H04N 7/08; H04N 21/23614; H04N 7/10
USPC .......................................................... 700/94
See application file for complete search history.

(56) References Cited

U.S. PATENT DOCUMENTS

| | | |
|---|---|---|
| 2006/0020474 A1 | 1/2006 | Stewart et al. |
| 2009/0096632 A1* | 4/2009 | Ullrich .................. H04N 21/81 340/407.1 |
| 2011/0142245 A1* | 6/2011 | Toba .................... H04N 21/436 381/22 |
| 2013/0227410 A1* | 8/2013 | Sridhara .......... H04N 21/43615 715/702 |
| 2014/0300454 A1* | 10/2014 | Lacroix .................... G08B 6/00 340/407.2 |
| 2015/0268723 A1* | 9/2015 | Saboune ................ G11B 27/10 345/156 |
| 2016/0175704 A1 | 6/2016 | Venkatesan et al. |
| 2018/0191927 A1* | 7/2018 | Lacroix .................. G06F 15/16 |

FOREIGN PATENT DOCUMENTS

| | | | |
|---|---|---|---|
| EP | 2795909 A1 | | 10/2014 |
| JP | 2004-272698 A | | 9/2004 |
| JP | 2004272698 A | * | 9/2004 |
| JP | 2011-124925 A | | 6/2011 |
| JP | 2014-204445 A | | 10/2014 |
| JP | 2015-509308 A | | 3/2015 |
| JP | 2015111417 A | | 6/2015 |
| JP | 2015-185168 A | | 10/2015 |
| JP | 2018-060313 A | | 4/2018 |
| WO | WO-2014055329 A1 | * | 4/2014 ......... H04L 12/6418 |

OTHER PUBLICATIONS

Jan. 16, 2024, Decision to Grant a Patent issued for related JP Application No. 2020-540227.

* cited by examiner

FIG.2

|  | VIDEO SIGNAL | AUDIO SIGNAL | TACTILE VIBRATION SIGNAL |
|---|---|---|---|
| DYNAMIC RANGE | 48 – 96 dB | 96 – 144 dB | 40 – 60 dB |
| SAMPLING FREQUENCY | 60Hz - | 48kHz - | 2 kHz - |
| CONTINUOUS/ DISCONTINUOUS | DISCONTINUOUS | CONTINUOUS | CONTINUOUS |
| DIMENSION | 2/3 DIMENSION | ONE DIMENSION | ONE DIMENSION |

F I G. 5

HDMI PIN LAYOUT (FOR Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

F I G. 11

| PREAMBLE | CHANNEL CODING | |
|---|---|---|
| "B" | 11101000 | 00010111 | SUBFRAME #1, BLOCK START |
| "M" | 11100010 | 00011101 | SUBFRAME #1 |
| "W" | 11100100 | 00011011 | SUBFRAME #2 |
| | 0 | 1 | |
| | (PRECEDING STATE) | | |

FIG.13

|   | 0 | 1 | 2 | 3 | 4 | 5 | 6 | 7 |
|---|---|---|---|---|---|---|---|---|
| 0 | 0<br>a="0" | 1<br>b="0" | 2<br>c | 3<br>d="001" : Multichannel LPCM | 4 | 5 | 6<br>Mode="00" | 7 |
| 1 |   |   |   |   |   |   |   |   |
| 2 |   |   |   |   |   |   |   |   |
| 3 |   |   |   |   |   |   |   |   |
| 4 |   |   |   |   |   |   |   |   |
| 5 |   |   |   |   | 44 | 45<br>Multichannel Count | 46 | 47 |
| 6 |   |   |   |   |   | 53 | 54<br>Multichannel configuration value | 55 |
| 7 | 56 | 57<br>Multichannel configuration value | 58 | 59 | 60 |   |   |   |
| 8 | 64<br>Multichannel map bit 65 to 191;<br>0: no info<br>1: Activated | 65<br>FL | 66<br>FR | 67<br>FC | 68<br>LFE | 69<br>LS | 70<br>RS | 71<br>FLc |
| 9 | 72<br>FLc | 73<br>BC | 74<br>LFE1 | 75<br>SiL | 76<br>SiR | 77<br>HFL | 78<br>HFR | 79<br>HFC |
| 10 | 80<br>Ohc | 81<br>HLS | 82<br>HRS | 83<br>HSiL | 84<br>HSiR | 85<br>HBC | 86<br>BtFC | 87<br>BtFLmid |
| 11 | 88<br>BtFRmid | 89<br>FLw | 90<br>FRw | 91<br>BL | 92<br>BR | 93<br>LBS | 94<br>RBS | 95<br>HBL |
| 12 | 96<br>HBR | 97<br>HFLw | 98<br>HFRw | 99<br>OhFL | 100<br>OhFR | 101<br>OhSiL | 102<br>OHsiR | 103<br>OhBL |
| 13 | 104<br>OhBR | 105<br>HFLmid | 106<br>HFRmid | 107<br>HBLmid | 108<br>HBRmid | 109<br>FLmid | 110<br>FRmid | 111<br>BLmid |
| 14 | 112<br>BRmid | 113<br>LFE2 | 114<br>BLmidDiffus | 115<br>BRmidDiffus | 116<br>OhBC | 117 | 118 | 119 |
| 15 | 120<br>Left Hand | 121<br>Right Hand | 122<br>Legs |   |   |   |   |   |
|   |   |   |   | ⋮ |   |   |   |   |
| 23 | 184<br>MS | 185<br>CS | 186<br>LSS | 187<br>RSS | 188<br>LRS | 189<br>RRS | 190<br>ISO/IEC<br>23001-8<br>CH1 | 191<br>ISO/IEC<br>23001-8<br>CH2 |

FIG.14

| Multichannel Configuration value | Multichannel Order; Channel number and label are based on IEC 62574 ED2 | ISO/IEC 23001-8 2016: ChannelConfiguration |
|---|---|---|
| 10000000 | 67: FC | ChannelConfiguration 1 |
| 01000000 | 65: FL<br>66: FR | ChannelConfiguration 2 |
| 11000000 | 65: FL<br>66: FR<br>67: FC | ChannelConfiguration 3 |
| 10010000 | 65: FL<br>66: FR<br>73: FC | ChannelConfiguration 3 |
| 00100000 | 65: FL<br>66: FR<br>67: FC<br>184: MS | ChannelConfiguration 4 |
| 10100000 | 65: FL<br>66: FR<br>67: FC<br>69: LS<br>70: RS | ChannelConfiguration 5 |
| 01100000 | 65: FL<br>66: FR<br>67: FC<br>68: LFE<br>69: LS<br>70: RS | ChannelConfiguration 6 |
| 11100000 | 65: FL<br>66: FR<br>67: FC<br>68: LFE<br>69: LS<br>70: RS<br>109: FLmid<br>110: FRmid | ChannelConfiguration 7 |

F I G. 15

| 1 (Start) | Q | CRC | | |
|---|---|---|---|---|
| 1 (Start) | Q | CRC | | |
| 1 (Start) | Q | 62574 ID: Speaker configurations | 62574 ID | |
| 1 (Start) | Q | Overhead speaker | Overhead speaker | |
| 1 (Start) | Q | High speakers | High speakers | |
| 1 (Start) | Q | Middle speakers | Middle speakers | |
| 1 (Start) | Q | Bottom speakers | Bottom speakers | |
| 1 (Start) | Q | Subwoofer (LFE) | Subwoofer (LFE) | |
| 1 (Start) | Q | Overhead speaker | Overhead speaker | |
| 1 (Start) | Q | High speakers | High speakers | |
| | | | | |
| 1 (Start) | Q | 0 | 0 | 0 | 0 | 0 | 0 |
| 1 (Start) | Q | 0 | 0 | 0 | 0 | 0 | 0 |

FIG. 16

| | | | | | | | | | | | | |
|---|---|---|---|---|---|---|---|---|---|---|---|---|
| 1 (Start) | Q | CRC | | | | | | | | | | |
| 1 (Start) | Q | CRC | | | | | | | | | | |
| 1 (Start) | Q | 62574 ID | | | | | | | | | | |
| 1 (Start) | Q | 62574 ID | | | | | | | | | | |
| 1 (Start) | Q | Multichannel Number #1 | | | | | | | | | | |
| 1 (Start) | Q | Multichannel order #1 | | | | | | | | | | |
| 1 (Start) | Q | Multichannel order #2 | | | | | | | | | | |
| 1 (Start) | Q | Multichannel Number #2 | | | | | | | | | | |
| 1 (Start) | | | | | | | | | | | | |
| 1 (Start) | | | | | | | | | | | | |
| 1 (Start) | Q | 0 | 0 | 0 | 0 | 0 | 0 | | | | | |
| 1 (Start) | Q | 0 | 0 | 0 | 0 | 0 | 0 | | | | | |

FIG. 17

| IEC 60958-1 preamble | IEC 60958-1 channel | Multichannel order | Multichannel subgroup 1 Multichannel Configuration C-Bit 53 to 60 | Multichannel subgroup 2 Multichannel Map C-Bit 64-191 | Multichannel subgroup 3 & 4 U-Bit |
|---|---|---|---|---|---|
| B | 1 | 1 | 11000000 | | |
| W | 2 | 2 | 65: FL | | |
| M | 1 | 3 | 66: FR | | |
| | | | 67: FC | | |
| W | 2 | 4 | | | |
| M | 1 | 5 | | 77: HFL | |
| W | 2 | 6 | | 78: HFR | |
| M | 1 | 7 | | | 80: OhC(1,0,0,0,0) |
| W | 2 | 8 | | | 65: FL(0,0,2,0,0) |
| | | | | | 66: FR(0,0,2,0,0) |
| M | 1 | 1 | 11000000 | | |
| W | 2 | 2 | 65: FL | | |
| M | 1 | 3 | 66: FR | | |
| | | | 67: FC | | |
| W | 2 | 4 | | | |
| M | 1 | 5 | | 77: HFL | |
| W | 2 | 6 | | 78: HFR | |
| M | 1 | 7 | | | 80: OhC(1,0,0,0,0) |
| W | 2 | 8 | | | 65: FL(0,0,2,0,0) |
| | | | | | 66: FR(0,0,2,0,0) |
| ... | ... | ... | ... | ... | ... |

FIG. 19

| MULTICHANNEL TRANSMISSION ORDER | CHANNEL NAME | CHANNEL NUMBER |
|---|---|---|
| 1 | Front Left | 65 |
| 2 | Front Right | 66 |
| 3 | Front Center | 67 |
| 4 | LFE | 68 |
| 5 | Left Surround | 69 |
| 6 | Right Surround | 70 |
| 7 | Left Hand (RIGHT ARM VIBRATION SIGNAL) | 120 |
| 8 | Right Hand (LEFT ARM VIBRATION SIGNAL) | 121 |

FIG.20

| IEC 60958-1 preamble | IEC 60958-1 channel | Multichannel order | Multichannel subgroup 1 |
|---|---|---|---|
| | | | Multichannel Map C-Bit 64-191 |
| B | 1 | 1 | 65:FL |
| W | 2 | 2 | 66:FR |
| B | 1 | 3 | 67:FC |
| W | 2 | 4 | 68:LFE |
| M | 1 | 5 | 69:LS |
| W | 2 | 6 | 70:RS |
| M | 1 | 7 | 120:Left Hand |
| W | 2 | 8 | 121:Right Hand |
| M | 1 | 1 | 65:FL |
| W | 2 | 2 | 66:FR |
| M | 1 | 3 | 67:FC |
| W | 2 | 4 | 68:LFE |
| M | 1 | 5 | 69:LS |
| W | 2 | 6 | 70:RS |
| M | 1 | 7 | 120:Left Hand |
| W | 2 | 8 | 121:Right Hand |
| ⋮ | ⋮ | ⋮ | ⋮ |

TRANSMITTING APPARATUS, TRANSMISSION METHOD, RECEIVING APPARATUS, AND RECEPTION METHOD

CROSS REFERENCE TO PRIOR APPLICATION

This application is a National Stage Patent Application of PCT International Patent Application No. PCT/JP2019/031547 (filed on Aug. 9, 2019) under 35 U.S.C. § 371, which claims priority to Japanese Patent Application No. 2018-162146 (filed on Aug. 30, 2018), which are all hereby incorporated by reference in their entirety.

TECHNICAL FIELD

The present technique relates to a transmitting apparatus, a transmission method, a receiving apparatus, and a reception method, and specifically relates to a transmitting apparatus, a transmission method, a receiving apparatus, and a reception method that handle tactile vibration signals along with audio signals.

BACKGROUND ART

In multichannel audio applications such as 5.1 channel or 7.1 channel applications, channels are used according to certain rules by being given names in order to identify methods how the individual channels are used. Those channels are a right channel, a left channel, a center channel, an LFE (Low Frequency Effect) channel and the like, for example. These are delivered to loud speakers arranged at positions represented by their names, and expected to be reproduced as sounds.

In recent years, multimedia applications have been proposed, and those proposed applications include a tactile vibration application used in synchronization with conventional audio videos, and the like. For example, PTL 1 describes a technique of transmitting tactile vibration signals (tactile signals), and vibrating a vibration section on the receiver side on the basis of the tactile vibration signals.

CITATION LIST

Patent Literature

[PTL 1]
JP 2018-060313A

SUMMARY

Technical Problems

In the tactile vibration application used in synchronization with audio videos, tactile vibration signals are desirably transferred in synchronization with audio signals. Then, at that time, the tactile vibration signals have signal properties that are different from those of the audio signals, and desirably the tactile vibration signals can be distinguished clearly from the audio signals. In addition, at that time, it is supposed that the tactile vibration signals themselves are formed by combining a plurality of signals according to certain rules, and desirably the plurality of signals also can be identified.

An object of the present technique is to transfer tactile vibration signals favorably in synchronization with audio signals.

Solution to Problems

A concept according to the present technique lies in a transmitting apparatus including a transmitting section that sequentially transmits transfer signals for respective blocks each including a plurality of frames to a receiver side via a predetermined transfer line. The transfer signals include a predetermined number of channels of audio signals and a predetermined number of channels of tactile vibration signals.

In the present technique, a transmitting section sequentially transmits transfer signals for respective blocks each including a plurality of frames to a receiver side via a predetermined transfer line. Here, the transfer signals include a predetermined number of channels of audio signals and a predetermined number of channels of tactile vibration signals. For example, the predetermined transfer line may be a coaxial cable, an optical cable, an Ethernet (IEC 61883-6) cable, an HDMI cable, an MHL cable, or a display port cable. In addition, for example, a processing section that generates the tactile vibration signals on the basis of media signals associated with the audio signals may further be included.

For example, an information adding section that adds, to the transfer signals, configuration information of the predetermined number of channels of audio signals and the predetermined number of channels of tactile vibration signals may further be included. In this case, for example, the configuration information may include identification information for distinguishing the tactile vibration signals from the audio signals. Then, in this case, for example, the identification information may include information of a vibration position targeted by each of the predetermined number of channels of tactile vibration signals.

In addition, for example, the information adding section may add the configuration information by using a predetermined channel-status bit area formed for each of the blocks. In addition, for example, the information adding section may add the configuration information by using user data bits of a predetermined number of consecutive frames.

In addition, for example, the plurality of frames may include repetitions of multichannel groups each including a predetermined number of frames, and the transmitting section may transmit the predetermined number of channels of audio signals and the predetermined number of channels of tactile vibration signals in a state that the predetermined number of channels of audio signals and the predetermined number of channels of tactile vibration signals are arranged in a time-division manner separately for each channel in all or some of the predetermined number of frames in each of the multichannel groups.

In such a way, in the present technique, transfer signals that include a predetermined number of channels of audio signals and a predetermined number of channels of tactile vibration signals and that are for each block including a plurality of frames are sequentially transmitted to a receiver side via a predetermined transfer line. Accordingly, tactile vibration signals can be transmitted favorably in synchronization with audio signals.

In addition, another concept of the present technique lies in a receiving apparatus including a receiving section that sequentially receives transfer signals for respective blocks each including a plurality of frames from a transmitter side via a predetermined transfer line. The transfer signals include a predetermined number of channels of audio signals and a predetermined number of channels of tactile vibration signals.

In the present technique, a receiving section sequentially receives transfer signals for respective blocks each including a plurality of frames from a transmitter side via a predetermined transfer line. Here, the transfer signals include a predetermined number of channels of audio signals and a predetermined number of channels of tactile vibration signals. For example, the predetermined transfer line may be a coaxial cable, an optical cable, an Ethernet (IEC 61883-6) cable, an HDMI cable, an MHL cable, or a display port cable.

For example, a processing section that processes the transfer signals, and outputs the predetermined number of channels of audio signals and the predetermined number of channels of tactile vibration signals may further be included. Then, in this case, for example, the transfer signals may include configuration information of the predetermined number of channels of audio signals and the predetermined number of channels of tactile vibration signals, and the processing section may process the signals on the basis of the configuration information and output the predetermined number of channels of audio signals and the predetermined number of channels of tactile vibration signals.

In addition, for example, the configuration information may be added by using a predetermined channel-status bit area formed for each of the blocks. In addition, for example, the configuration information may be added by using user data bits of a predetermined number of consecutive frames. In addition, for example, the plurality of frames may include repetitions of multichannel groups each including a predetermined number of frames, and the predetermined number of channels of audio signals and the predetermined number of channels of tactile vibration signals may be arranged in a time-division manner separately for each channel in all or some of the predetermined number of frames in each of the multichannel groups.

In such a way, in the present technique, transfer signals that include a predetermined number of channels of audio signals and a predetermined number of channels of tactile vibration signals and that are for each block including a plurality of frames are sequentially received by a transmitter side via a predetermined transfer line. Accordingly, tactile vibration signals can be received favorably in synchronization with audio signals.

BRIEF DESCRIPTION OF DRAWINGS

FIG. 2 is a figure illustrating a comparison among video signals, audio signals, and tactile vibration signals in terms of examples of dynamic ranges, sampling frequencies, continuity/discontinuity, and dimensions.

FIG. 5 is a figure illustrating a pin array of an HDMI connector.

FIG. 11 is a figure illustrating channel coding of preambles in the IEC 60958 standard.

FIG. 13 is a figure schematically illustrating a channel status format in the IEC 60958 standard.

FIG. 14 is a figure illustrating a correspondence between multichannel configuration values and audio channel sets represented thereby.

FIG. 15 is a figure illustrating one example of packets specifying the number of speakers at each height.

FIG. 16 is a figure illustrating one example of packets specifying which audio channel is to be transmitted in the transmission order within a multichannel group.

FIG. 17 is a figure illustrating a specific example of a method of specifying multichannel groups 1 to 4 in the multichannel transfer format.

FIG. 19 is a figure illustrating a transfer signal including 5.1 channel audio and two channels of tactile vibration signals.

FIG. 20 is a figure for explaining an example in which multichannel subgroups for transferring multichannel audio signals and a predetermined number of channels of tactile vibration signals simultaneously are specified by a second method.

DESCRIPTION OF EMBODIMENT

In the following, a mode for carrying out the invention (hereinafter, called "embodiment") are explained. Note that the explanation is given in the following order.

1. Embodiment
2. Modification Examples

1. EMBODIMENT

[Configuration Example of AV System]

Figure 1A:
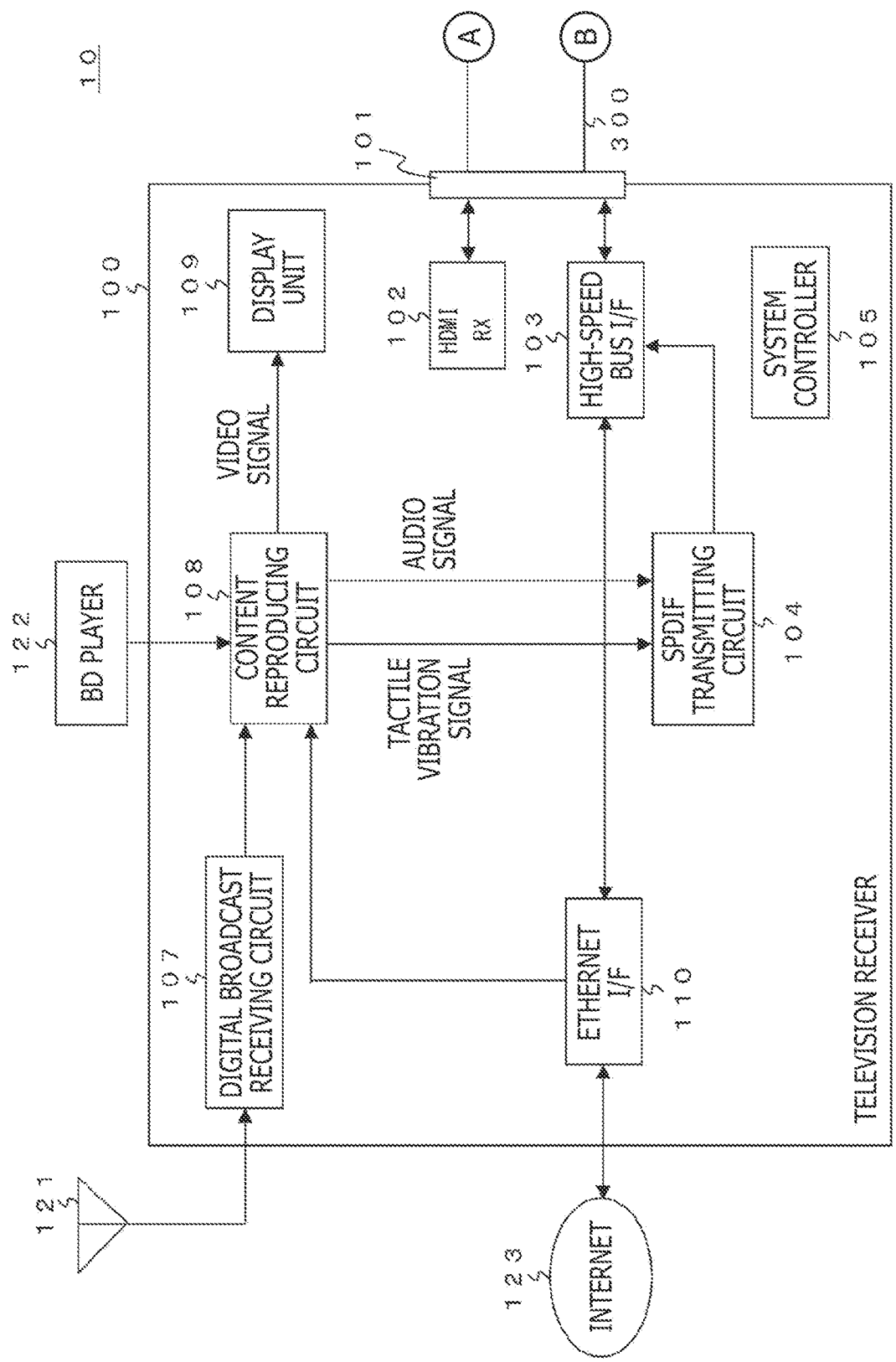
FIG. 1 depicts block diagrams illustrating a configuration example of an AV system as an embodiment.
Figure 1B:
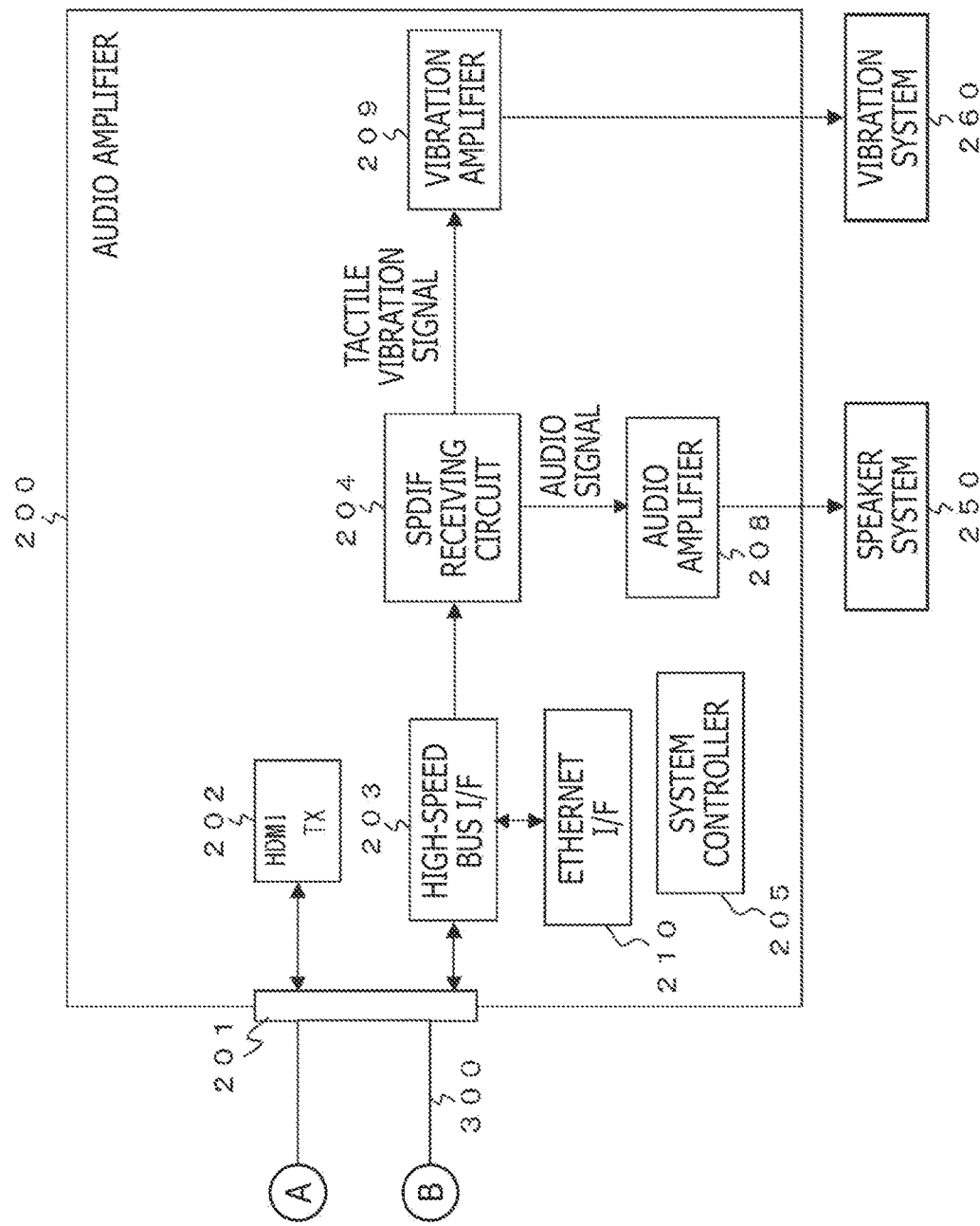

FIG. 1 illustrates a configuration example of an AV (Audio/Visual) system 10 as an embodiment. The AV system 10 has a television receiver 100 and an audio amplifier 200. The television receiver 100 is connected with a television broadcast reception antenna 121, a BD (Blu-ray Disc) player 122, and the Internet 123. In addition, the audio amplifier 200 is connected with a two-channel or multichannel speaker system 250, and a one-channel or multichannel vibration system 260. Note that "Blu-ray" is a registered trademark.

The television receiver 100 and the audio amplifier 200 are connected via an HDMI cable 300. Note that "HDMI" is a registered trademark. The television receiver 100 is provided with an HDMI terminal 101 connected with an HDMI receiving section (HDMI RX) 102, and a high-speed bus interface 103 that is included in a communicating section. The audio amplifier 200 is provided with an HDMI terminal 201 connected with an HDMI transmitting section (HDMI TX) 202, and a high-speed bus interface 203 that is included in a communicating section. One end of the HDMI cable 300 is connected to the HDMI terminal 101 of the television receiver 100, and the other end is connected to the HDMI terminal 201 of the audio amplifier 200.

The television receiver 100 has the HDMI receiving section 102, the high-speed bus interface 103, and an SPDIF transmission circuit 104. In addition, the television receiver 100 has a system controller 105, a digital broadcast reception circuit 107, a content reproduction circuit 108, a display section 109, and an Ethernet interface 110. Note that "Ethernet" is a registered trademark. In addition, in the example illustrated in the figure, each section of an image system is omitted as appropriate for simplification of the explanation.

The system controller 105 controls operation of each section of the television receiver 100. The digital broadcast reception circuit 107 processes television broadcast signals input from the reception antenna 121, and outputs video signals, multichannel audio signals (linear PCM signals), and a predetermined number of channels of tactile vibration signals according to broadcast content. Here, the multichannel audio signals include a plurality of channels of audio signals.

The Ethernet interface 110 communicates with an external server via the Internet 123, and outputs video signals, multichannel audio signals (linear PCM signals), and a predetermined number of channels of tactile vibration signals according to network content. By performing reproduction operation, the BD player 122 outputs video signals, multichannel audio signals (linear PCM signals), and a predetermined number of channels of tactile vibration signals according to reproduced content.

The content reproduction circuit 108 selectively takes out the video signals, the multichannel audio signals, and the predetermined number of channels of tactile vibration signals obtained at the digital broadcast reception circuit 107, the Ethernet interface 110, or the BD player 122. Then, the content reproduction circuit 108 sends the video signals to the display section 109. The display section 109 displays an image of the video signals.

In addition, the content reproduction circuit 108 sends the multichannel audio signals and the predetermined number of channels of tactile vibration signals to the SPDIF transmission circuit 104. The SPDIF transmission circuit 104 is a circuit for transmitting digital audio transfer signals according to the IEC 60958 standard (hereinafter, referred to as "SPDIF signals" as appropriate). The SPDIF transmission circuit 104 is a transmission circuit conforming to the IEC 60958 standard. Note that details of the SPDIF signals are mentioned below.

The SPDIF transmission circuit 104 transmits the multichannel audio signals (linear PCM signals) and the predetermined number of channels of tactile vibration signals to the audio amplifier 200 simultaneously. In this case, as the SPDIF signals, transfer signals for respective blocks each including a plurality of frames, 192 frames here, are transmitted sequentially. Then, the transfer signals include the multichannel audio signals (linear PCM signals) and the predetermined number of channels of tactile vibration signals.

Here, the plurality of frames includes repetitions of multichannel groups each including a predetermined number of frames. The multichannel audio signals and the predetermined number of channels of tactile vibration signals are arranged in a time-division manner separately for each channel in all or some of the predetermined number of frames in each of the multichannel groups.

Configuration information of the multichannel audio signals and the predetermined number of channels of tactile vibration signals is added to the transfer signals. The configuration information includes identification information for distinguishing the tactile vibration signals from the audio signals. In addition, the identification information includes information of a vibration position targeted by each of the predetermined number of channels of tactile vibration signals. For example, the configuration information is added by using a predetermined channel-status bit area formed for each block. In addition, for example, the configuration information is added by using user data bits of a predetermined number of consecutive frames.

The HDMI receiving section 102 receives video and audio data supplied to the HDMI terminal 101 via the HDMI cable 300 through communication conforming to HDMI. The high-speed bus interface 103 is an interface of a bidirectional communication path including a reserve line and an HPD (Hot Plug Detect) line included in the HDMI cable 300. Note that details of the HDMI receiving section 102 and the high-speed bus interface 103 are mentioned below.

The audio amplifier 200 has the HDMI transmitting section 202, the high-speed bus interface 203, and an SPDIF reception circuit 204. In addition, the audio amplifier 200 has a system controller 205, an audio amplifier 208, a vibration amplifier 209, and an Ethernet interface 210.

The system controller 205 controls operation of each section of the audio amplifier 200. The HDMI transmitting section 202 sends out video and audio data from the HDMI terminal 201 to the HDMI cable 300 through communication conforming to HDMI. The high-speed bus interface 203 is an interface of a bidirectional communication path including a reserve line and an HPD (Hot Plug Detect) line included in the HDMI cable 300. Note that details of the HDMI transmitting section 202 and the high-speed bus interface 203 are mentioned below.

The SPDIF reception circuit 204 receives transfer signals as SDPIF signals (digital audio signals according to the IEC 60958 standard), and acquires multichannel audio signals and a predetermined number of channels of tactile vibration signals included in the transfer signals. In this case, the multichannel audio signals and the predetermined number of channels of tactile vibration signals are taken out on the basis of configuration information included in the transfer signals.

The audio amplifier 208 amplifies, for each channel, the multichannel audio signals taken out at the SPDIF reception circuit 204, and sends the multichannel audio signals to the speaker system 250 having speakers corresponding to the individual channels. Thereby, audio reproduction according to the multichannel audio signals is performed at the speaker system 250.

In addition, the vibration amplifier 209 amplifies, for each channel, the predetermined number of channels of tactile vibration signals taken out at the SPDIF reception circuit 204, and sends the predetermined number of channels of tactile vibration signals to the vibration system 260 having vibration devices corresponding to the individual channels. Thereby, vibration reproduction according to the predetermined number of channels of tactile vibration signals is performed at the vibration system 260. In this case, because as mentioned above the predetermined number of channels of tactile vibration signals are sent simultaneously with the multichannel audio signals, the vibration reproduction becomes correctly synchronized with the audio reproduction, and also are synchronized with the moving image display on the display section 109 of the television receiver 100.

FIG. 2 illustrates a comparison among video signals, audio signals, and tactile vibration signals in terms of examples of dynamic ranges, sampling frequencies, continuity/discontinuity, and dimensions. Video signals have a dynamic range of 48 to 96 dB, have a sampling frequency of 60 Hz, and are discontinuous two-dimensional or three-dimensional signals. In addition, audio signals have a dynamic range of 96 to 144 dB, have a sampling frequency of 48 kHz, and are continuous one-dimensional signals.

Then, tactile vibration signals have a dynamic range of 40 to 60 dB, have a sampling frequency of 2 kHz, and are continuous one-dimensional signals. In such a way, similarly to the audio signals, the tactile vibration signals have a high sampling frequency, and are continuous signals. Accordingly, as mentioned above, by transferring the tactile vibration signals simultaneously with the audio signals by using a transfer line for the audio signals, a transfer synchronized with the audio signals can be achieved simply and easily.

Note that, as mentioned above, the tactile vibration signals are said to have a dynamic range of 40 to 60 dB, and have a frequency band of DC-1 kHz, but are similar to the audio signals rather than to the video signals. A digital audio interface capable of a linear PCM transfer can also transfer the tactile vibration signals. In this case, regarding the DC domain, it is possible to use expressions like "push" for positivity, and "pull" or "draw" for negativity.

Figure 3:
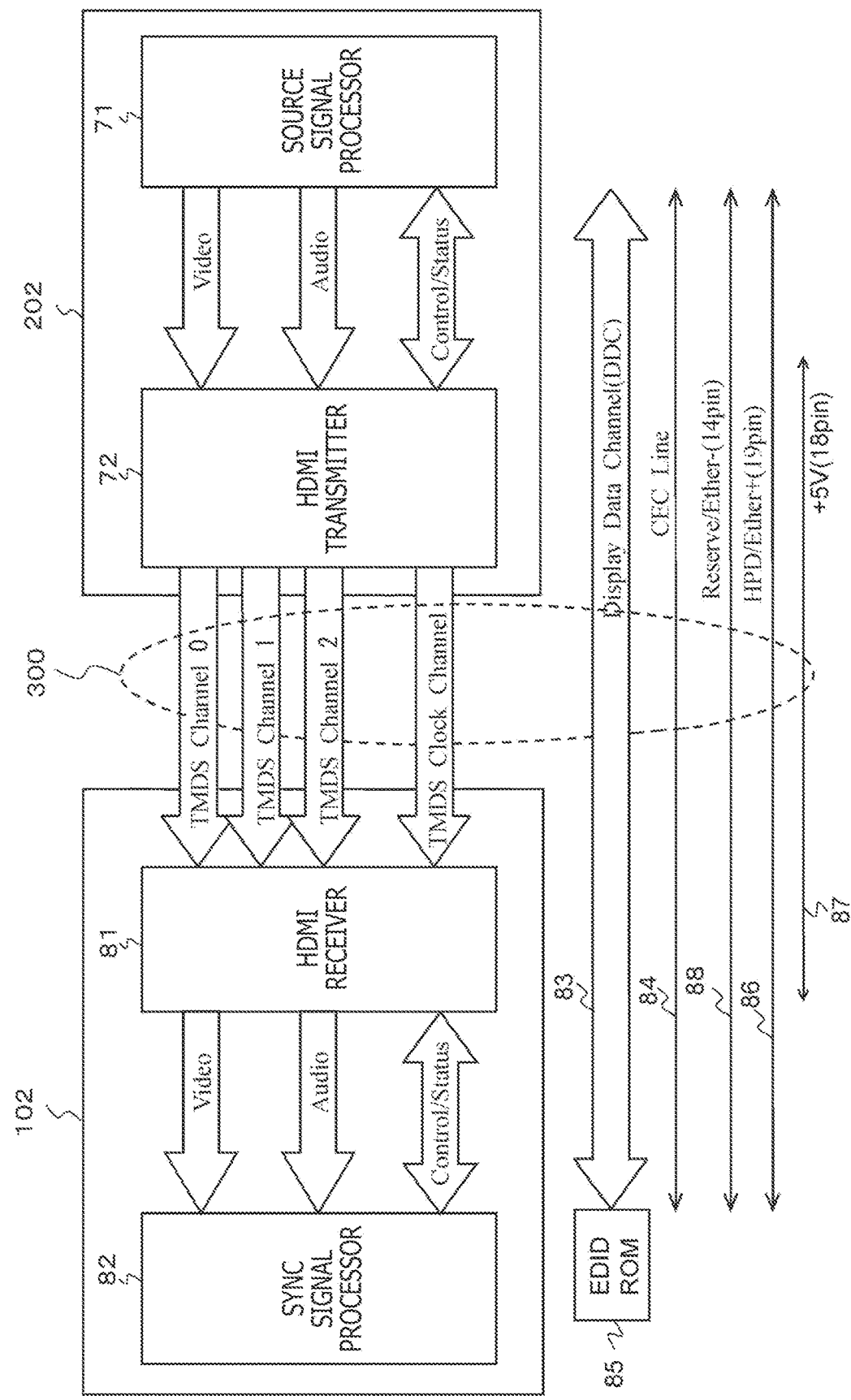
FIG. 3 is a block diagram illustrating configuration examples of an HDMI receiving section of a television receiver, and an HDMI transmitting section of an audio amplifier.

"Configuration Example of HDMI Transmitting Section/ Receiving Section" FIG. 3 illustrates configuration examples of the HDMI receiving section 102 of the television receiver 100, and the HDMI transmitting section 202 of the audio amplifier 200 in the AV system 10 illustrated in FIG. 1.

In an active image period (hereinafter, referred to as an "active video period" as appropriate) which is a period from a vertical synchronization signal to the next vertical synchronization signal (hereinafter, referred to as a "video field" as appropriate) from which a horizontal blanking period and a vertical blanking period are excluded, the HDMI transmitting section 202 unidirectionally transmits, to the HDMI receiving section 102 through a plurality of channels, baseband (uncompressed) differential signals of image data corresponding to one screen. In addition, in the horizontal blanking period and the vertical blanking period, the HDMI transmitting section 202 unidirectionally transmits, to the HDMI receiving section 102 through a plurality of channels, audio data and control packets (Control Packets) that accompany the image data, and furthermore differential signals corresponding to other auxiliary data and the like.

The HDMI transmitting section 202 has a source signal processing section 71 and an HDMI transmitter 72. The source signal processing section 71 is supplied with baseband, uncompressed image (Video) and audio (Audio) data. The source signal processing section 71 performs a necessary process on the supplied image and audio data, and supplies the image and audio data to the HDMI transmitter 72. In addition, the source signal processing section 71 exchanges information for control and status-informing information (Control/Status), and the like with the HDMI transmitter 72 as necessary.

The HDMI transmitter 72 converts the image data supplied from the source signal processing section 71 into corresponding differential signals, and unidirectionally transmits the differential signals to the HDMI receiving section 102 connected via the HDMI cable 300 through three TMDS channels #0, #1, and #2 which are a plurality of channels.

Further, the transmitter 72 converts the audio data, the control packets, and the other auxiliary data (auxiliary data) that are supplied from the source signal processing section 71, and accompany the uncompressed image data, and control data (control data) such as vertical synchronization signals (VSYNC) and horizontal synchronization signals (HSYNC) into corresponding differential signals, and unidirectionally transmits the differential signals to the HDMI receiving section 102 connected via the HDMI cable 300 through the three TMDS channels #0, #1, and #2.

In addition, the transmitter 72 transmits, to the HDMI receiving section 102 connected via the HDMI cable 300 through a TMDS clock channel, a pixel clock synchronized with the image data transmitted through the three TMDS channels #0, #1, and #2.

The HDMI receiving section 102 receives the differential signals corresponding to the image data that are unidirectionally transmitted from the HDMI transmitting section 202 through the plurality of channels in the active video period, and receives the differential signals corresponding to the auxiliary data and the control data that are transmitted from the HDMI transmitting section 202 through the plurality of channels in the horizontal blanking period and the vertical blanking period.

The HDMI receiving section 102 has an HDMI receiver 81 and a synchronization signal processing section 82. The HDMI receiver 81 receives the differential signals corresponding to the image data, and the differential signals corresponding to the auxiliary data and the control data that are transmitted thereto unidirectionally from the HDMI transmitting section 202 connected via the HDMI cable 300 through the TMDS channels #0, #1, and #2, in synchronization with the pixel clock transmitted thereto through the TMDS clock channel from the HDMI transmitting section 202 in the same manner. Further, the HDMI receiver 81 converts the differential signals into corresponding image data, auxiliary data, and control data, and supplies the image data, auxiliary data, and control data to the synchronization signal processing section 82 as necessary.

The synchronization signal processing section 82 performs a necessary process on the data supplied from the HDMI receiver 81, and outputs the data. Other than this, the synchronization signal processing section 82 exchanges information for control and status-informing information (Control/Status), and the like with the HDMI receiver 81 as necessary.

Besides the three TMDS channels #0, #1, and #2 for unidirectionally and serially transferring the image data, the auxiliary data, and the control data from the HDMI transmitting section 202 to the HDMI receiving section 102 in synchronization with the pixel clock, and the TMDS clock channel as a transfer channel for transferring the pixel clock, HDMI transfer channels include transfer channels called a DDC (Display Data Channel) 83, and furthermore a CEC line 84.

The DDC 83 includes two unillustrated lines (signal lines) included in the HDMI cable 300, and is used by source equipment to read out an E-EDID (Enhanced-Extended Display Identification) from sink equipment connected via the HDMI cable 300. That is, the sink equipment has an EDIDROM 85. The source equipment reads out, via the DDC 83, the E-EDID stored on the EDIDROM 85 from the sink equipment connected via the HDMI cable 300, and recognizes the configuration and capacity of the sink equipment on the basis of the E-EDID.

The CEC line 84 includes one unillustrated line included in the HDMI cable 300, and is used for performing bidirectional communication of data for control between the source equipment and the sink equipment.

In addition, the HDMI cable 300 includes a line 86 connected to a pin called an HPD (Hot Plug Detect). The source equipment can detect a connection with the sink equipment by using the line 86. In addition, the HDMI cable 300 includes a line 87 used for supplying a power supply from the source equipment to the sink equipment. Furthermore, the HDMI cable 300 includes a reserve line 88.

Figure 4:
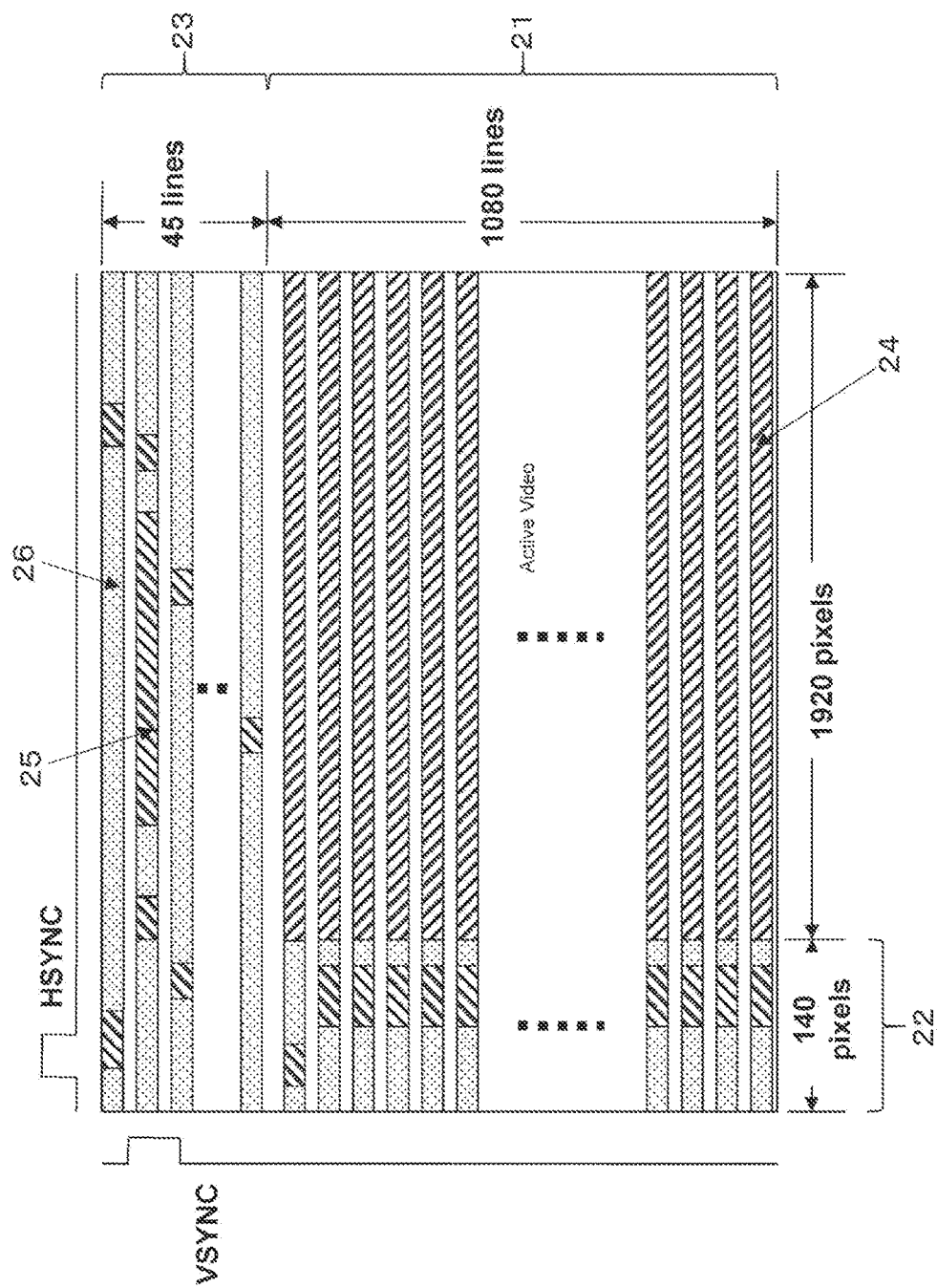
FIG. 4 is a figure illustrating various types of transfer data period in a case where image data including 1920 pixels× 1080 lines in the horizontal direction and vertical direction is transferred through TMDS channels.

FIG. 4 illustrates various types of transfer data period in a case where image data including 1920 pixels×1080 lines in the horizontal direction and vertical direction is transferred through the TMDS channels. Video fields in which transfer data is transferred through the three TMDS channels of HDMI include three types of period which include a video data period 24, a data island period 25, and a control period 26 which are used according to the type of transfer data.

Here, the video field period is a period from a rising edge (Active Edge) of a vertical synchronization signal to a rising edge of the next vertical synchronization signal, and is classified into a horizontal blanking period 22 (Horizontal Blanking), a vertical blanking period 23 (Vertical Blanking), and an active pixel period 21 (Active Video) which is a period of the video field period from which the horizontal blanking period and the vertical blanking period are excluded.

The video data period 24 is allocated to the active pixel period 21. In the video data period 24, data of active pixels (Active Pixels) corresponding to 1920 pixels (pixels)×1080 lines included in uncompressed image data corresponding to one screen is transferred. The data island period 25 and the control period 26 are allocated to the horizontal blanking period 22 and the vertical blanking period 23. In these data island period 25 and control period 26, the auxiliary data (Auxiliary Data) is transferred.

That is, the data island period 25 is allocated to portions of the horizontal blanking period 22 and the vertical blanking period 23. In the data island period 25, for example, audio data packets and the like which are data included in the auxiliary data and are not related to control are transferred. The control period 26 is allocated to other portions of the horizontal blanking period 22 and the vertical blanking period 23. In the control period 26, for example, vertical synchronization signals, horizontal synchronization signals, the control packets, and the like which are data included in the auxiliary data and related to control are transferred.

FIG. 5 illustrates a pin array of an HDMI connector. This pin array is an example of the type A (type-A). Two lines which are differential lines to transfer TMDS Data #i+ and TMDS Data #i−, which are differential signals of a TMDS channel #i, are connected to pins to which TMDS Data #i+ is allocated (pins with the pin numbers 1, 4, and 7), and pins to which TMDS Data #i− is allocated (pins with the pin numbers 3, 6, and 9).

In addition, the CEC line 84 to transfer CEC signals, which are data for control, is connected to a pin with the pin number 13, and a pin with the pin number 14 is a reserved (Reserved) pin. In addition, a line to transfer SDA (Serial Data) signals such as an E-EDID is connected to a pin with the pin number 16, and a line to transfer SCL (Serial Clock) signals, which are clock signals used for synchronization at the time of transmission and reception of the SDA signals, is connected to a pin with the pin number 15. The DDC 83 mentioned above includes a line to transfer SDA signals and a line to transfer SCL signals.

In addition, the HPD line 86 for the source equipment to detect a connection with the sink equipment as mentioned above is connected to a pin with the pin number 19. In addition, the power-supply line 87 for supplying the power supply as mentioned above is connected to a pin with the pin number 18.

"Configuration Example of High-Speed Bus Interface"

Figure 6:
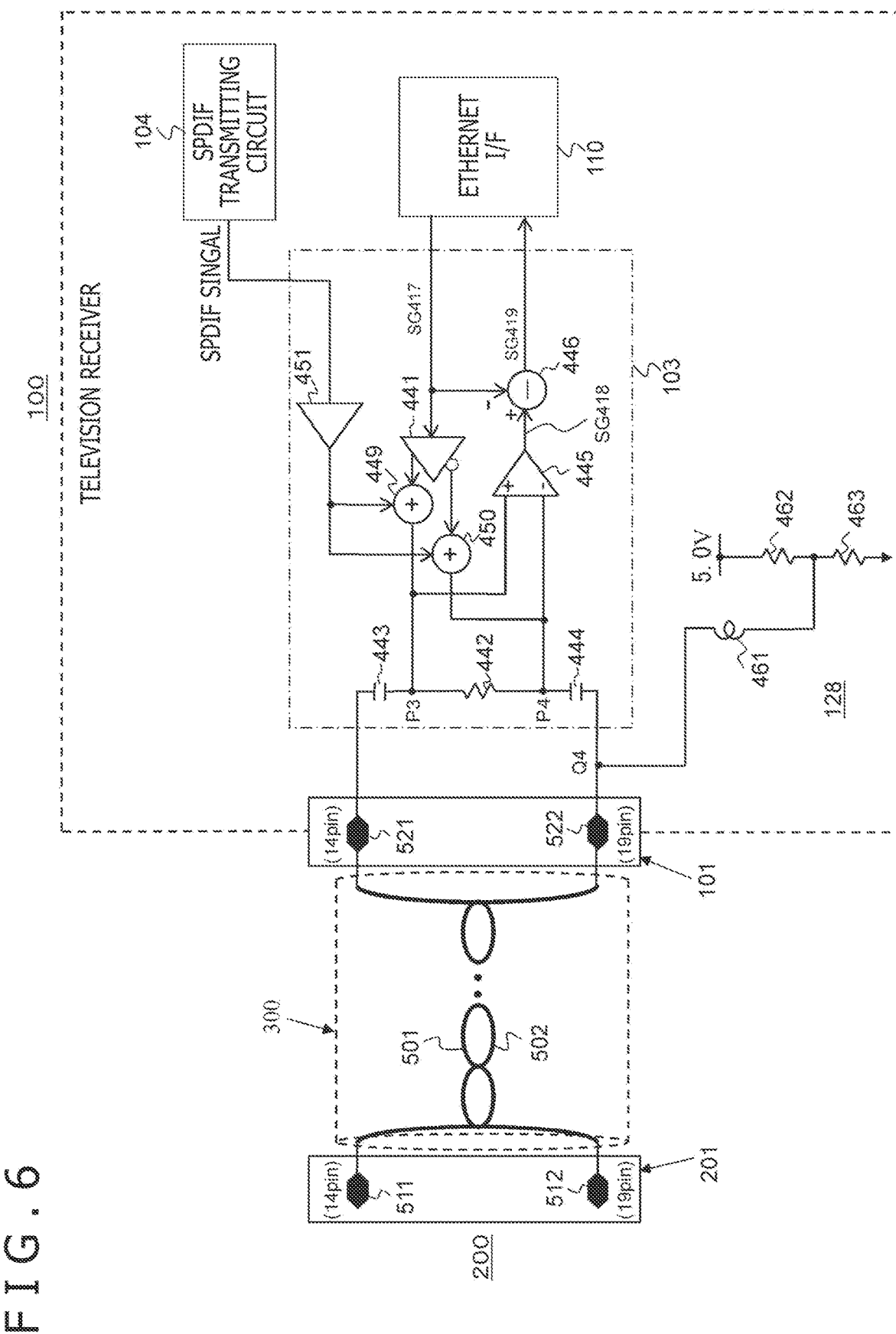
FIG. 6 is a figure illustrating a configuration example of a high-speed bus interface of the television receiver.

FIG. 6 illustrates a configuration example of the high-speed bus interface 103 of the television receiver 100 in the AV system 10 illustrated in FIG. 1. The Ethernet interface 110 uses a transfer line including a pair of lines, i.e., the reserve line and the HPD line, in a plurality of lines included in the HDMI cable 300, and performs LAN (Local Area Network) communication, that is, transmission and reception of Ethernet signals. The SPDIF transmission circuit 104 transmits SPDIF signals by using the transfer line including the pair of lines mentioned above.

The television receiver 100 has a LAN signal transmission circuit 441, a termination resistor 442, AC coupling capacitors 443 and 444, a LAN signal reception circuit 445, a subtraction circuit 446, addition circuits 449 and 450, and an amplifier 451. These are included in the high-speed bus interface 103. In addition, the television receiver 100 has a choke coil 461, a resistor 462, and a resistor 463 that are included in a plug connection transfer circuit 128.

A series circuit of the AC coupling capacitor 443, the termination resistor 442, and the AC coupling capacitor 444 is connected between a 14-pin terminal 521 and a 19-pin terminal 522 of the HDMI terminal 101. In addition, a series circuit of the resistor 462 and the resistor 463 is connected between a power supply line (+5.0V) and a ground wire. Then, a connection point between the resistor 462 and the resistor 463 is connected to a connection point Q4 between the 19-pin terminal 522 and the AC coupling capacitor 444 via the choke coil 461.

A connection point P3 between the AC coupling capacitor 443 and the termination resistor 442 is connected to the output side of the addition circuit 449, and is connected to the positive input side of the LAN signal reception circuit 445. In addition, a connection point P4 between the AC coupling capacitor 444 and the termination resistor 442 is connected to the output side of the addition circuit 450, and is connected to the negative input side of the LAN signal reception circuit 445.

One input side of the addition circuit 449 is connected to the positive output side of the LAN signal transmission circuit 441, and the other input side of the addition circuit 449 is supplied, via the amplifier 451, with an SPDIF signal output from the SPDIF transmission circuit 104. In addition, one input side of the addition circuit 450 is connected to the negative output side of the LAN signal transmission circuit 441, and the other input side of the addition circuit 450 is supplied, via the amplifier 451, with an SPDIF signal output from the SPDIF transmission circuit 104.

The input side of the LAN signal transmission circuit 441 is supplied with a transmission signal (transmission data)

SG417 from the Ethernet interface 110. In addition, the positive terminal of the subtraction circuit 446 is supplied with an output signal SG418 of the LAN signal reception circuit 445, and the negative terminal of the subtraction circuit 446 is supplied with the transmission signal SG417. At the subtraction circuit 446, the transmission signal SG417 is subtracted from the output signal SG418 of the LAN signal reception circuit 445, and a reception signal (reception data) SG419 is obtained. In a case where a LAN signal (Ethernet signal) is transmitted as a differential signal via the reserve line and the HPD line, the reception signal SG419 serves as the LAN signal. The reception signal SG419 is supplied to the Ethernet interface 110.

Figure 7:
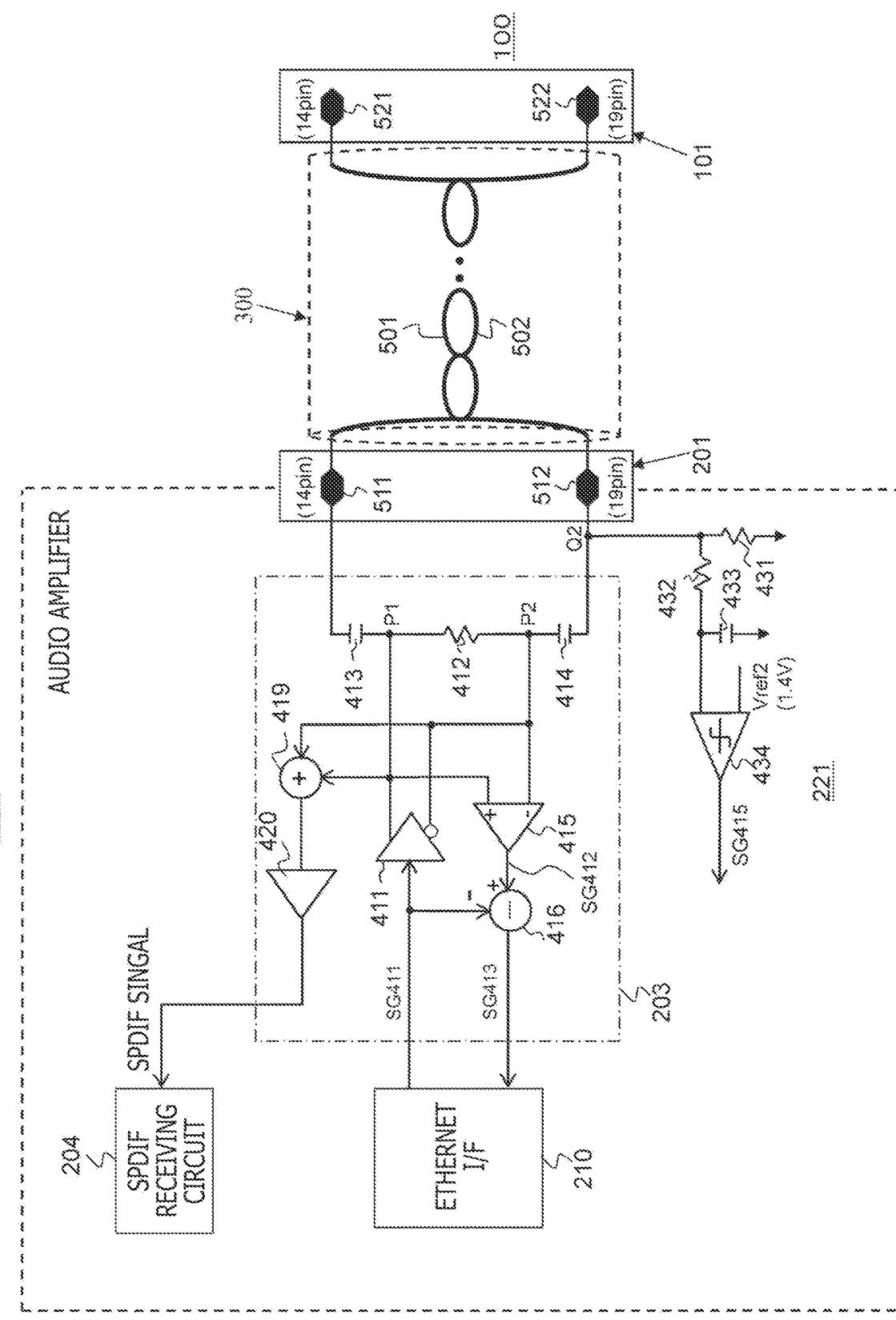
FIG. 7 is a figure illustrating a configuration example of a high-speed bus interface of the audio amplifier.

FIG. 7 illustrates a configuration example of the high-speed bus interface 203 of the audio amplifier 200 in the AV system 10 illustrated in FIG. 1. The Ethernet interface 210 uses a transfer line including a pair of lines, i.e., the reserve line and the HPD line, in a plurality of lines included in an HDMI cable 610, and performs LAN (Local Area Network) communication, that is, transmission and reception of Ethernet signals. The SPDIF reception circuit 204 receives SPDIF signals by using the transfer line including the pair of lines mentioned above.

The audio amplifier 200 has a LAN signal transmission circuit 411, a termination resistor 412, AC coupling capacitors 413 and 414, a LAN signal reception circuit 415, a subtraction circuit 416, an addition circuit 419, and an amplifier 420. These are included in the high-speed bus interface 203. In addition, the audio amplifier 200 has a pull-down resistor 431, a resistor 432, a capacitor 433, and a comparator 434 that are included in a plug connection detection circuit 221. Here, the resistor 432 and the capacitor 433 are included in a low pass filter.

A series circuit of the AC coupling capacitor 413, the termination resistor 412, and the AC coupling capacitor 414 is connected between a 14-pin terminal 511 and a 19-pin terminal 512 of the HDMI terminal 201. A connection point P1 between the AC coupling capacitor 413 and the termination resistor 412 is connected to the positive output side of the LAN signal transmission circuit 411, and is connected to the positive input side of the LAN signal reception circuit 415.

A connection point P2 between the AC coupling capacitor 414 and the termination resistor 412 is connected to the negative output side of the LAN signal transmission circuit 411, and is connected to the negative input side of the LAN signal reception circuit 415. The input side of the LAN signal transmission circuit 411 is supplied with a transmission signal (transmission data) SG411 from the Ethernet interface 210.

The positive terminal of the subtraction circuit 416 is supplied with an output signal SG412 of the LAN signal reception circuit 415, and the negative terminal of the subtraction circuit 416 is supplied with the transmission signal (transmission data) SG411. At the subtraction circuit 416, the transmission signal SG411 is subtracted from the output signal SG412 of the LAN signal reception circuit 415, and a reception signal SG413 is obtained. In a case where a LAN signal (Ethernet signal) is transmitted as a differential signal via the reserve line and the HPD line, the reception signal SG413 serves as the LAN signal. The reception signal SG413 is supplied to the Ethernet interface 210.

A connection point Q2 between the AC coupling capacitor 414 and the 19-pin terminal 512 is connected to a ground wire via the pull-down resistor 431 and is connected to a ground wire via a series circuit of the resistor 432 and the capacitor 433. Then, an output signal of the low pass filter obtained at a connection point between the resistor 432 and the capacitor 433 is supplied to one input terminal of the comparator 434. At the comparator 434, the output signal of the low pass filter is compared with a reference voltage Vref2 (+1.4V) supplied to the other input terminal. An output signal SG415 of the comparator 434 is supplied to an unillustrated control section (CPU) of the audio amplifier 200.

In addition, the connection point P1 between the AC coupling capacitor 413 and the termination resistor 412 is connected to one input terminal of the addition circuit 419. In addition, the connection point P2 between the AC coupling capacitor 414 and the termination resistor 412 is connected to the other input terminal of the addition circuit 419. An output signal of the addition circuit 419 is supplied to the SPDIF reception circuit 204 via the amplifier 420. In a case where an SPDIF signal is transmitted as an in-phase signal via the reserve line and the HPD line, the output signal of the addition circuit 419 serves as the SPDIF signal.

"Details of SPDIF Signals"

Figure 8:
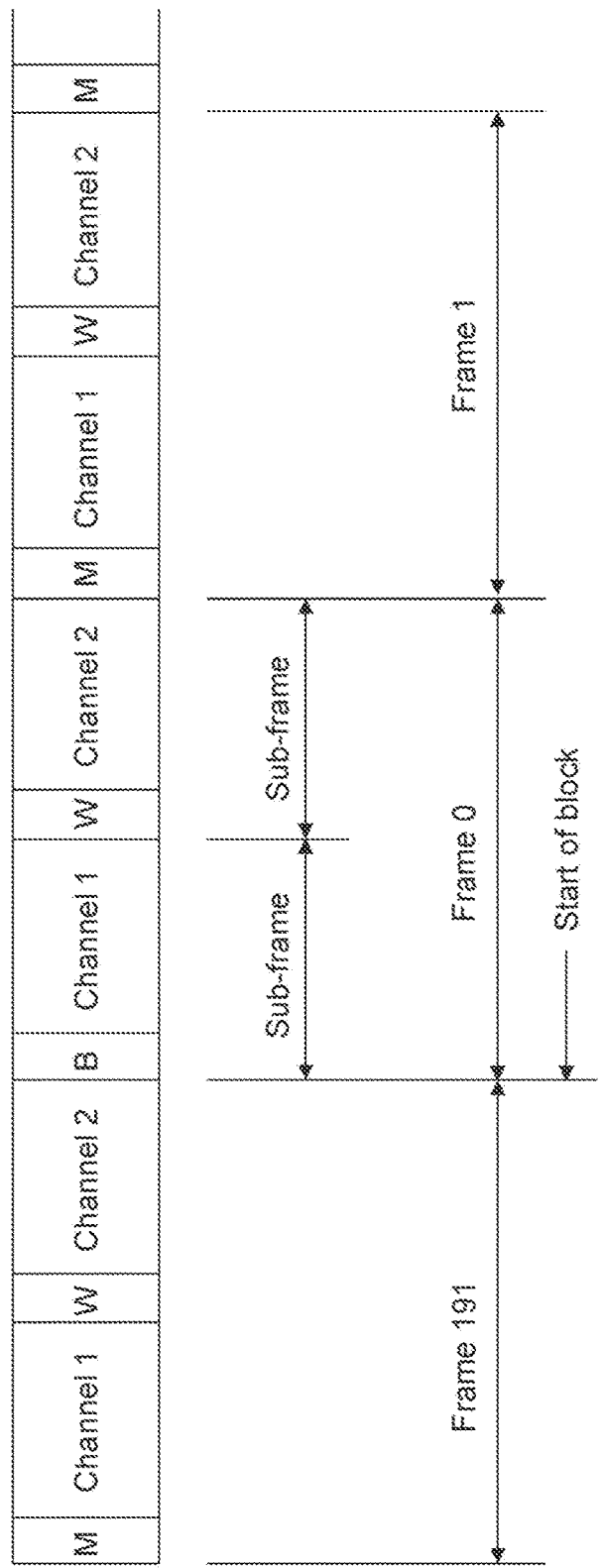
FIG. 8 is a figure illustrating a frame configuration in the IEC 60958 standard.

First, an overview of the IEC 60958 standard is explained. FIG. 8 illustrates a frame configuration in the IEC 60958 standard. Each frame includes two subframes. In a case of two-channel stereo audio, the first subframe includes a left channel signal, and the second subframe include a right channel signal.

At the beginning of a subframe, a preamble is provided as described below. The left channel signal is given "M" as the preamble, and the right channel signal is given "W" as the preamble. It should be noted however that as the preamble of the beginning of each set of 192 frames, "B" representing the start of a block is given. That is, one block includes 192 frames. The block is a unit that forms a channel status mentioned below.

Figure 9:
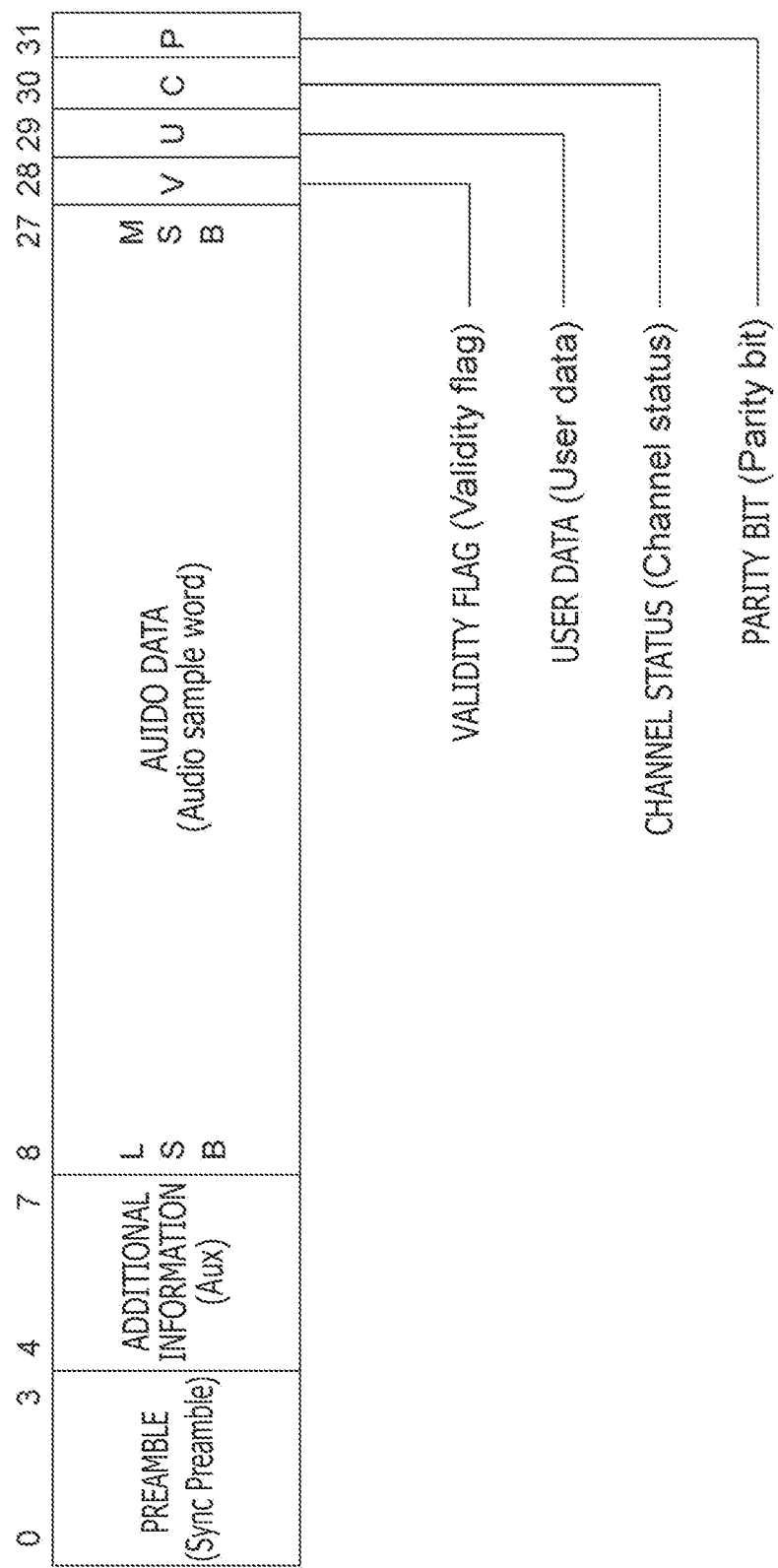
FIG. 9 is a figure illustrating a subframe configuration in the IEC 60958 standard.

FIG. 9 illustrates a subframe configuration in the IEC 60958 standard. A subframe includes zeroth to 31st time slots, i.e., 32 time slots in total. The zeroth to third time slots represent a preamble (Sync preamble). As mentioned above, the preamble represents any one of "M," "W," and "B" in order to distinguish between left and right channels or to represent the start position of a block.

The fourth to 27th time slots are a main data field, and in a case where the 24-bit code range is adopted, the whole represents audio data. In addition, in a case where the 20-bit code range is adopted, the eighth to 27th time slots represent audio data (Audio sample word). In the latter case, the fourth to seventh time slots can be used as additional information (Auxiliary sample bits). The example in the figure illustrates the latter case.

The 28th time slot is a validity flag (Validity flag) of the main data field. The 29th time slot represents one bit of user data (User data). By accumulating the 29th time slots over individual frames, a series of user data can be formed. A message of the user data is formed in the unit of eight-bit information units (IUs: Information Units), and one message includes three to 129 information units.

There may be zero to eight bits of "0" between information units. The beginning of an information unit is identified by a start bit "1." The first seven information units in a message are reserved, and a user can set desired information in the eighth and subsequent information units. Messages are divided by eight or more bits of "0."

The 30th time slot represents one bit of a channel status (Channel status). By accumulating the 30th time slots over individual frames for each block, a series of channel statuses can be formed. Note that the beginning position of a block is represented by a preamble of "B" (the zeroth to third time slots) as mentioned above.

The 31st time slot is a parity bit (Parity bit). The parity bit is given such that the number of "0" and "1" included in the fourth to 31st time slots becomes an even number.

Figure 10:
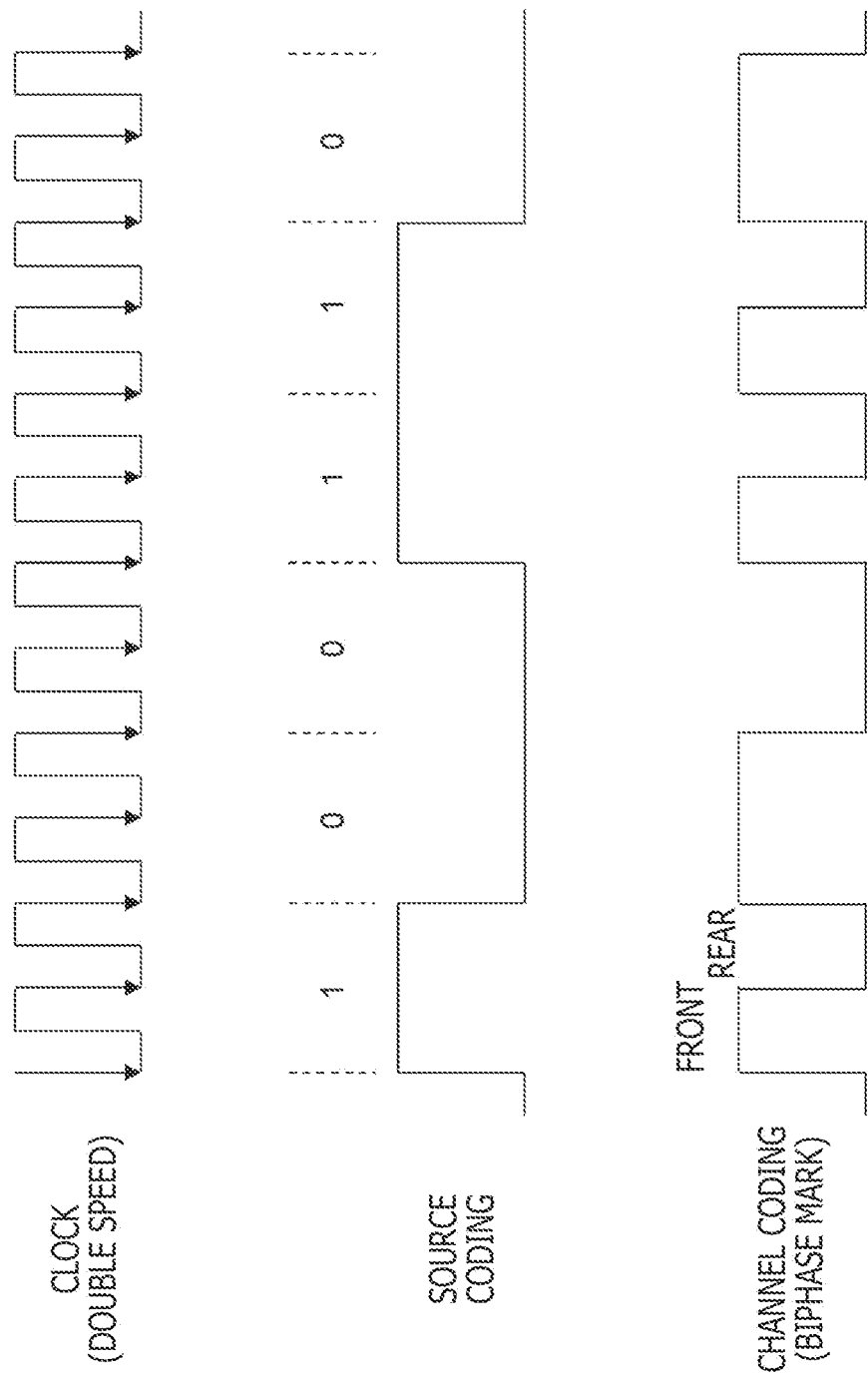
FIG. 10 is a figure illustrating a signal modulation method in the IEC 60958 standard.

FIG. 10 illustrates a signal modulation method in the IEC 60958 standard. The fourth to 31st time slots in a subframe excluding the preamble are subjected to biphase mark modulation. At the time of this biphase mark modulation, a clock that is two times faster than an original signal (source coding) is used. If the clock cycle of the original signal is divided into the first half and the second half, the output of the biphase mark modulation is necessarily inverted at the edge of the first half clock cycle. In addition, when the original signal represents "1" at the edge of the second half clock cycle, the output is inverted, and when the original signal represents "0" at the edge of the second half clock cycle, the output is not inverted. Thereby, it becomes possible to extract a clock component in the original signal from the signal having been subjected to biphase mark modulation.

FIG. 11 illustrates channel coding of preambles in the IEC 60958 standard. As mentioned above, the fourth to 31st time slots in a subframe are subjected to biphase mark modulation. On the other hand, the preamble in the zeroth to third time slots is not subjected to normal biphase mark modulation, but is handled as a bit pattern synchronized with a clock which is two times faster. That is, by allocating two bits to each time slot of the zeroth to third time slots, 8-bit patterns like the ones illustrated in the figure are obtained.

If the previous state is "0," "11101000" is allocated to the preamble "B," "11100010" is allocated to the preamble "M," and "1100100" is allocated to the preamble "W." On the other hand, if the previous state is "1," "00010111" is allocated to the preamble "B," "00011101" is allocated to the preamble "M," and "00011011" is allocated to the preamble "W."

In this embodiment, a multichannel transfer format based on the IEC 60958 standard is used to transfer the multichannel audio signals and the predetermined number of channels of tactile vibration signals mentioned above simultaneously.

Figure 12:
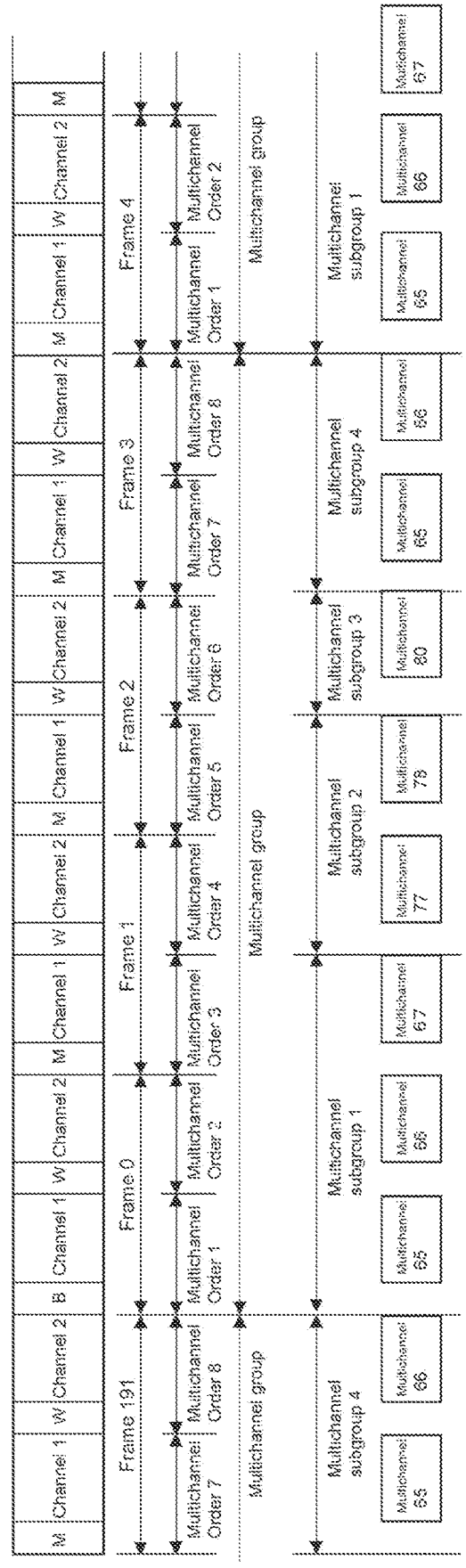
FIG. 12 is a figure illustrating one example of a frame configuration in a multichannel transfer format.

First, the multichannel transfer format is explained. FIG. 12 illustrates one example of the frame configuration in the multichannel transfer format. One block includes 192 frames in the IEC 60958 standard, and the 192 frames include repetitions of multichannel groups (Multichannel groups) each including a predetermined number of subframes. Each subframe portion is included in a multichannel order. How many subframes are included in a multichannel group can be represented by using a predetermined channel-status bit area formed for each block.

In addition, one or more multichannel subgroups each for transferring multichannel audio signals are formed in a multichannel group. A multichannel subgroup includes one or more multichannel orders. A signal of each channel of multichannel audio signals is arranged sequentially in each multichannel order included in the multichannel subgroup. What types of multichannel subgroups are formed in a multichannel group can be represented by using a predetermined channel-status bit area formed for each block, and can also be represented by using user data bits of a predetermined number of frames.

In the example illustrated in the figure, one multichannel group includes eight subframes, that is, multichannel orders 1 to 8. In addition, four multichannel subgroups, i.e., multichannel subgroups 1 to 4, are formed in a multichannel group.

A multichannel subgroup 1 includes multichannel orders 1 to 3, and a signal (a signal with the channel number 65, 66, or 67) of each channel of three channels of multichannel audio signals is arranged sequentially in each multichannel order. Here, the channel number 65 represents front left (FL), the channel number 66 represents front right (FR), and the channel number 67 represents front center (FC).

In addition, a multichannel subgroup 2 includes multichannel orders 4 to 5, and a signal (a signal with the channel number 77 or 78) of each channel of two channels of multichannel audio signals is arranged sequentially in each multichannel order. Here, the channel number 77 represents high front left (HFL), and the channel number 78 represents front right (HFR).

In addition, a multichannel subgroup 3 includes a multichannel order 6, and one channel of a multichannel audio signal (a signal with the channel number 80) is arranged in the multichannel order. Here, the channel number 80 represents overhead center (OhC).

In addition, a multichannel subgroup 4 includes multichannel orders 7 to 8, and two channels of multichannel audio signals (signals with the channel numbers 65 and 66) are arranged sequentially in the multichannel order.

A manner of specifying multichannel subgroups formed in a multichannel group is explained. Examples of the method of specifying multichannel subgroups include the following first to third methods.

The first method is a method of directly specifying multichannel subgroups by using multichannel configuration information stored in channel-status bits 63 to 60 formed for each block. Here, the multichannel configuration represents an audio channel set formed by combining predetermined audio channels in advance. In this first method, only an audio channel set formed by combining predetermined audio channels in advance can be specified.

The second method is a method of specifying channel subgroups by using a multichannel map stored in channel-status bits 165 to 191 formed for each block, and setting 1 in a bit corresponding to an applicable channel. In this second method, an audio channel set formed by combining desired audio channels can be specified, but the transmission order becomes the order of appearance on the multichannel map, and cannot be made a desired transmission order.

FIG. 13 schematically illustrates a channel status format in the IEC 60958 standard. The channel statuses are the 30th time slots of subframes that are accumulated for each block (see FIG. 9). In this figure, each of rows that are arranged in the vertical direction represents the content of a channel status of one byte, and the bit configuration in each byte is represented in the horizontal direction. Note that it is supposed in the explanation here that the format for consumer use (Consumer use) is used.

The zeroth bit (bit 0) a is set to "0," and this represents that the channel status is for consumer use. In addition, the first bit (bit 1) b is set to "0," and this represents that it is a linear PCM sample. In addition, the sixth and seventh bits (bits 6 to 7) represent the mode of the channel status.

In addition, the 44th bit to 47th bit (bits 44 to 47) form a four-bit field representing "Multichannel Count," and represent the number of subframes to be included in a multichannel groups. For example, "0000" represents 2ch LPCM, that is, represents that the number of subframes to be included in a multichannel group is 2, "1011" represents 64ch LPCM, that is, represents that the number of subframes to be included in a multichannel group is 64, "1100" represents 32ch LPCM, that is, represents that the number of subframes to be included in a multichannel group is 32, "1101" represents 16ch LPCM, that is, represents that the number of subframes to be included in a multichannel group is 16, "1110" represents 8ch LPCM, that is, represents that the number of subframes to be included in a multichannel group is 8, and further "1111" represents 4ch LPCM, that is, represents that the number of subframes to be included in a multichannel group is 4.

In addition, the 53rd to 60th bits form an eight-bit field representing "Multichannel configuration value," and represent a multichannel configuration value to be used for specifying multichannel subgroups according to the first method.

FIG. 14 illustrates a correspondence between multichannel configuration values and audio channel sets represented thereby. Each audio channel set is determined in accordance with ISO/IEC 23001-8 2016 and is identified by a multichannel configuration value. Note that, although not illustrated in FIG. 14, it is also possible to specify audio channel sets designated in ITU-R BS.2094-1, and audio channel sets unique to IEC.

A multichannel configuration value "10000000" represents that there is an audio channel set (multichannel subgroups) with a channel configuration 1 (ChannelConfiguration 1) and that this audio channel set includes only an audio channel "67:FC." In addition, a multichannel configuration value "01000000" represents that there is an audio channel set (multichannel subgroups) with a channel configuration 2 (ChannelConfiguration 2) and that this audio channel set includes audio channels "65:FL" and "66:FR," and these are to be transmitted in this order.

In addition, a multichannel configuration value "11000000" represents that there is an audio channel set (multichannel subgroups) with a channel configuration 3 (ChannelConfiguration 3) and that this audio channel set includes audio channels "65:FL," "66:FR," and "67:FC," and these are to be transmitted in this order. In addition, a multichannel configuration value "00100000" represents that there is an audio channel set (multichannel subgroups) with a channel configuration 4 (ChannelConfiguration 4) and that this audio channel set includes audio channels "65:FL," "66:FR," "67:FC," and "184:MS," and these are to be transmitted in this order.

In addition, a multichannel configuration value "10100000" represents that there is an audio channel set (multichannel subgroups) with a channel configuration 5 (ChannelConfiguration 5) and that this audio channel set includes audio channels "65:FL," "66:FR," "67:FC," "69: LS," and "70:RS," and these are to be transmitted in this order.

In addition, a multichannel configuration value "01100000" represents that there is an audio channel set (multichannel subgroups) with a channel configuration 6 (ChannelConfiguration 6) and that this audio channel set includes audio channels "65:FL," "66:FR," "67:FC," "68: LFE," "69:LS," and "70:RS," and these are to be transmitted in this order.

In addition, a multichannel configuration value "11100000" represents that there is an audio channel set (multichannel subgroups) with a channel configuration 7 (ChannelConfiguration 7) and that this audio channel set includes audio channels "65:FL," "66:FR," "67:FC," "68: LFE," "69:LS," "70:RS," "109:FLmid," and "110:FRmid," and these are to be transmitted in this order.

Here, the numbers such as 65, 66, 67, 68, 69, 70, 109, and 110 are numbers unique to audio channels that are determined according to the multichannel map used in the second method, and each number corresponds to a particular speaker. For example, the front left speaker is given the number 65, and the front right speaker is given the number 66. These numbers are used also in the third method. These speaker positions and numbers are determined in IEC 62574 on the basis of ITU-R BS.2094-1 and ISO/IEC 23001-8, but this is not the sole example, and there may be other channels that are assigned uniquely. Note that, in a case where of the multichannel configuration value is "00000000," this represents that there are no audio channel sets (multichannel subgroups) specified by the first method.

Returning to FIG. 13, the 64th bit (bit 64) represents whether or not the multichannel map of the 65th bit to the 191st bit is used to specify an audio channel set (multichannel subgroups). For example, "0" represents that an audio channel set is not specified, and "1" represents that an audio channel set is specified. In the multichannel map from the 65th bit to the 191st bit, bit numbers are used as numbers corresponding to channel-specific numbers as is.

For example, the 65th bit corresponds to the audio channel "65:FL," and in a case where the audio channel "65:FL" is to be included in an audio channel set specified by the second method, the 65th bit is set to 1. Although not explained in detail, bits are set similarly also in a case where the other audio channels are included in audio channel sets specified by the second method.

The third method is a method of specifying multichannel subgroups by using user data bits of a predetermined number of consecutive frames. In this third method, an audio channel set formed by combining desired audio channels can be specified, and the transmission order of individual audio channels can also be set as desired.

In the third method, multichannel configuration information is packetized and embedded by using user data bits. In this case, first, a packet specifying the number of speakers at each height is sent. FIG. 15 illustrates one example of the packet. Here, the types of height include "Overhead," "High," "Middle," "Bottom," and "LFE." It is designated how many speakers are arranged in total in each layer. By repeating this mechanism within a packet, a plurality of multichannel subgroups can be formed. Next, a packet specifying which audio channel is to be transmitted in the transmission order within a multichannel group is sent. FIG. 16 illustrates one example of the packet.

This third method has the highest degree of freedom as a method of specifying an audio channel set (multichannel subgroups), makes it possible to transmit particular audio channels in a particular order, and also makes it possible to transmit them multiple times.

FIG. 17 illustrates a specific example of a method of specifying multichannel groups 1 to 4 in one example of frame configurations in the multichannel transfer format illustrated in FIG. 12 mentioned above. The multichannel subgroup 1 is specified by the first method. In this case, the values "Multichannel configuration values" in the channel-status 53rd to 60th bits are set to "11000000," and this represents that there is an audio channel set (multichannel subgroups) including "65:FL," "66:FR," and "67:FC" (see FIG. 14).

In addition, the multichannel subgroup 2 is specified by the second method. In this case, the channel-status 64th bit is set to "1," and this represents that there is an audio channel set (multichannel subgroups) specified by the second method in which the multichannel map is used. Furthermore, the 77th bit and the 78th bit are set to 1, and this represents that the audio channel set (multichannel subgroups) has a configuration including audio channels "77:HFL" and "78: HFR" in this order.

In addition, the multichannel subgroups 3 and 4 are specified by the third method. In this case, regarding the multichannel subgroup 3, a packet specifying the number of speakers at each height (see FIG. 15) represents that the number of overhead speakers included is one, and a packet (see FIG. 16) specifying which audio channel is to be transmitted represents an audio channel "80:OhC."

In addition, regarding the multichannel subgroup 4, a packet specifying the number of speakers at each height (see FIG. 15) represents that the number of bottom speakers included is two, and packets (see FIG. 16) specifying which audio channels are to be transmitted represent audio channels "65:FL" and "66:FR."

In this embodiment, multichannel subgroups specified by the first to third methods mentioned above are used to transfer multichannel audio signals and a predetermined number of channels of tactile vibration signals simultaneously. Note that ISO/IEC 23001-8 2016 currently does not include definitions of a set including tactile vibration signals. However, if it is defined in the future, it is also possible to specify multichannel subgroups for transferring multichannel audio signals and a predetermined number of channels of tactile vibration signals simultaneously by the first method.

In addition, in order to specify multichannel subgroups for transferring multichannel audio signals and a predetermined number of channels of tactile vibration signals simultaneously by the second method, tactile vibration signals may be newly defined in undefined bits in the 65th bit to the 191st bit included in a channel-status multichannel map. In this embodiment, tactile vibration signals are defined in the 120th bit to 122nd bit as illustrated in FIG. 13, for example.

Tactile vibration signals, which are one type of multimedia signal, are signals to be used for vibrating actuators attached to a human body. These tactile vibration signals can be transferred by using an uncompressed audio signal transfer line, but the signals are arranged unevenly, and are concentrated at the lower band. Those signals include direct current components for representing pressures in some cases.

If these tactile vibration signals are reproduced with a conventional audio amplifier, they cannot be reproduced correctly, an amplifying element is broken due to damages caused by heat or the like, and in a case where speakers are connected, voice coils get disconnected in the worst case. In order to avoid this problem, unique channel numbers are assigned to tactile vibration signals and are distinguished from audio channel signals. For example, a right-arm vibration signal is given the number 120, and defined in the 120th bit of a multichannel map. In addition, for example, a left-arm vibration signal is given the number 121 and defined in the 121st bit of the multichannel map. In addition, a vibration signal for both legs is given the number 122 and defined in the 122nd bit of the multichannel map. Note that tactile vibration signals are not limited to these signals, and other tactile vibration signals are only required to be assigned unique numbers and distinguished from audio channel signals.

In addition, it is also possible to use channel numbers of tactile vibration signals determined in the second method mentioned above to thereby specify multichannel subgroups for transferring multichannel audio signals and a predetermined number of channels of tactile vibration signals simultaneously by the third method. Alternatively, it is also possible to determine channel numbers of tactile vibration signals uniquely by the third method and perform operation according to certain rules uniquely.

Note that the manner of specifying multichannel subgroups for transferring multichannel audio signals and a predetermined number of channels of tactile vibration signals simultaneously can be changed for each block (192 frames), and by adopting time-division, it is also possible to transfer the same number of or a larger number of channels of tactile vibration signals as or than the number of channels of tactile vibration signals allocated to the multichannel subgroups. For example, possible cases include a case where many vibration units are attached to the whole body of a user and are vibrated one for each second starting from the lowest one to upper ones, and other cases.

Figure 18:
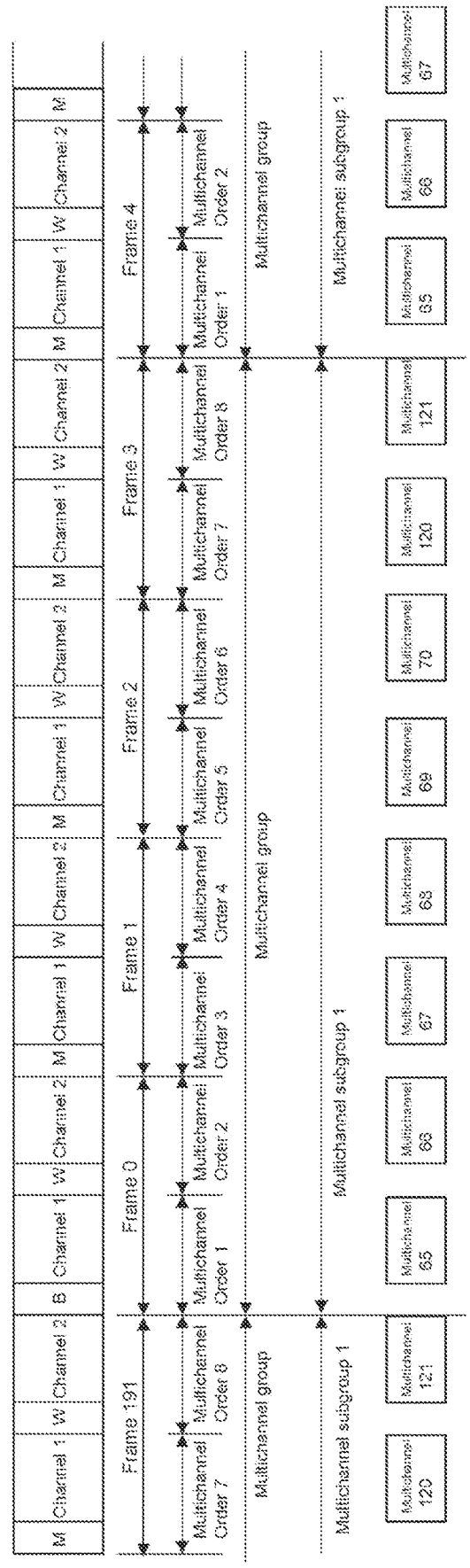
FIG. 18 is a figure illustrating one example of the frame configuration in the multichannel transfer format in a case where multichannel audio signals and a predetermined number of channels of tactile vibration signals are transferred simultaneously.

FIG. 18 illustrates one example of the frame configuration in the multichannel transfer format in a case where multichannel audio signals and a predetermined number of channels of tactile vibration signals are transferred simultaneously. Although not explained in detail, this frame configuration illustrated in FIG. 18 is similar to the frame configuration illustrated in FIG. 12 as a whole.

In this example, one multichannel subgroup of the multichannel subgroup 1, is formed in a multichannel group including eight subframes, that is, multichannel orders 1 to 8. Then, this example is an example in which the one multichannel subgroup transfers 5.1 channel audio and two channels of tactile vibration signals like the ones illustrated in FIG. 19.

A signal (a signal with the channel number 65, 66, 67, 68, 69, 78, 120 or 121) of each channel of multichannel audio signals and a predetermined number of channels of tactile vibration signals is arranged sequentially in the multichannel orders 1 to 8 included in the multichannel subgroup 1.

Here, the channel numbers 65 to 70 represent individual audio channels included in multichannel audio signals, "65" represents front left (FL), "66" represents front right (FR), "67" represents front center (FC), "68" represents LFE, "69" represents left surround, and "70" represents right surround. In addition, the channel numbers 120 and 121 represent individual channels of tactile vibration signals, "120" represents left hand (right-arm vibration signal), and "121" represents right hand (left-arm signal signal).

Note that, although one multichannel subgroup is formed in a multichannel group in the example illustrated by the frame configuration illustrated in FIG. 18, a plurality of multichannel subgroups may be formed in a multichannel group, and also other possible cases include not only a case where a signal of each channel of multichannel audio signals and a predetermined number of channels of tactile vibration signals is arranged sequentially in all the multichannel subgroups, but also a case where only a signal of each channel of multichannel audio signals is arranged in some multichannel subgroups, or a case where only a signal of each channel of a predetermined number of channels of tactile vibration signals is arranged in some multichannel subgroups.

A multichannel subgroup in which a signal of each channel of multichannel audio signals and a predetermined number of channels of tactile vibration signals is arranged sequentially can be specified by the first to third methods mentioned above. Specifying information in this case also serves as configuration information of the multichannel audio signals and the predetermined number of channels of tactile vibration signals. The configuration information includes identification information for distinguishing the tactile vibration signals from the audio signals. In addition, the identification information includes information of a vibration position targeted by each of the predetermined number of channels of tactile vibration signals.

FIG. 20 illustrates a case where the multichannel subgroup 1 is specified by the second method in the one example of the frame configuration in the multichannel transfer format illustrated in FIG. 18 mentioned above. In this case, the channel-status 64th bit (see FIG. 13) is set to "1," and this represents that there is a multichannel subgroup specified by the second method in which the multichannel map is used.

Then, the 65th bit to the 70th bit, and the channel-status 120th bit to 121st bit are set to 1, and it is represented that this multichannel subgroup has a configuration including audio channels "65:FL," "66:FR," "67:FC," "68:LFE," "69:LS," and "70:RS" in this order, and further including channels of tactile vibration signals of "120:Left Hand" and "121:Left Hand" in this order.

As mentioned above, in the AV system 10 illustrated in FIG. 1, signals that include a predetermined number of channels of audio signals and a predetermined number of channels of tactile vibration signals and that are for each block including 192 frames are transmitted from the television receiver 100 to the audio amplifier 200 via the HDMI cable 300. Accordingly, the tactile vibration signals can be transferred favorably from the television receiver 100 to the audio amplifier 200 in synchronization with the audio signals.

In addition, in the AV system 10 illustrated in FIG. 1, the 192 frames included in a block are repetitions of multichannel groups each including a predetermined number of subframes, a signal of each channel of multichannel audio signals (a predetermined number of channels of audio signals) and a predetermined number of channels of tactile vibration signals is arranged sequentially in a multichannel subgroup with a configuration specified by a predetermined channel-status bit area or a predetermined number of continuous user data bits that is/are formed in the multichannel group, and the signals are transmitted. Accordingly, on the basis of the configuration information acquired from the predetermined channel-status bit area or a predetermined number of continuous user data bits, the audio amplifier 200, which is the receiver side, can simply and appropriately acquire the predetermined number of channels of audio signals and the predetermined number of channels of tactile vibration signals.

In addition, in the AV system 10 illustrated in FIG. 1, the configuration information mentioned above includes identification information that makes it possible to distinguish between the simultaneously transmitted multichannel audio signals and a predetermined number of channels of tactile vibration signals. Accordingly, the audio amplifier 200, which is the receiver side, can acquire individual signals from the simultaneously transmitted multichannel audio signals and a predetermined number of channels of tactile vibration signals while making a distinction therebetween, and accordingly it is possible to prevent operation errors in which tactile vibration signals are supplied to an audio signal reproduction system by an error and to prevent other errors, for example.

In addition, in the AV system 10 illustrated in FIG. 1, in a case where a plurality of channels of tactile vibration signals is to be transmitted, the configuration information mentioned above includes information of vibration positions targeted by the individual channels of the tactile vibration signals. Accordingly, it becomes possible for the audio amplifier 200, which is the receiver side, to appropriately vibrate vibration devices at the vibration positions targeted by the individual channels of the tactile vibration signals.

Note that advantages described in the present specification are presented merely for illustrative purposes and do not limit the advantages of the present technique. There may be additional advantages.

2. MODIFICATION EXAMPLE

Note that, in the embodiment mentioned above, tactile vibration signals transmitted by the television receiver 100 to the audio amplifier 200 are ones included in broadcast content, network content, or reproduced content. However, in a case where tactile vibration signals are not included in those pieces of content, media signals associated with audio signals, for example, audio signals and video signals included in content, may be analyzed to generate tactile vibration signals, and the tactile vibrations signals may be used.

Figure 21A:
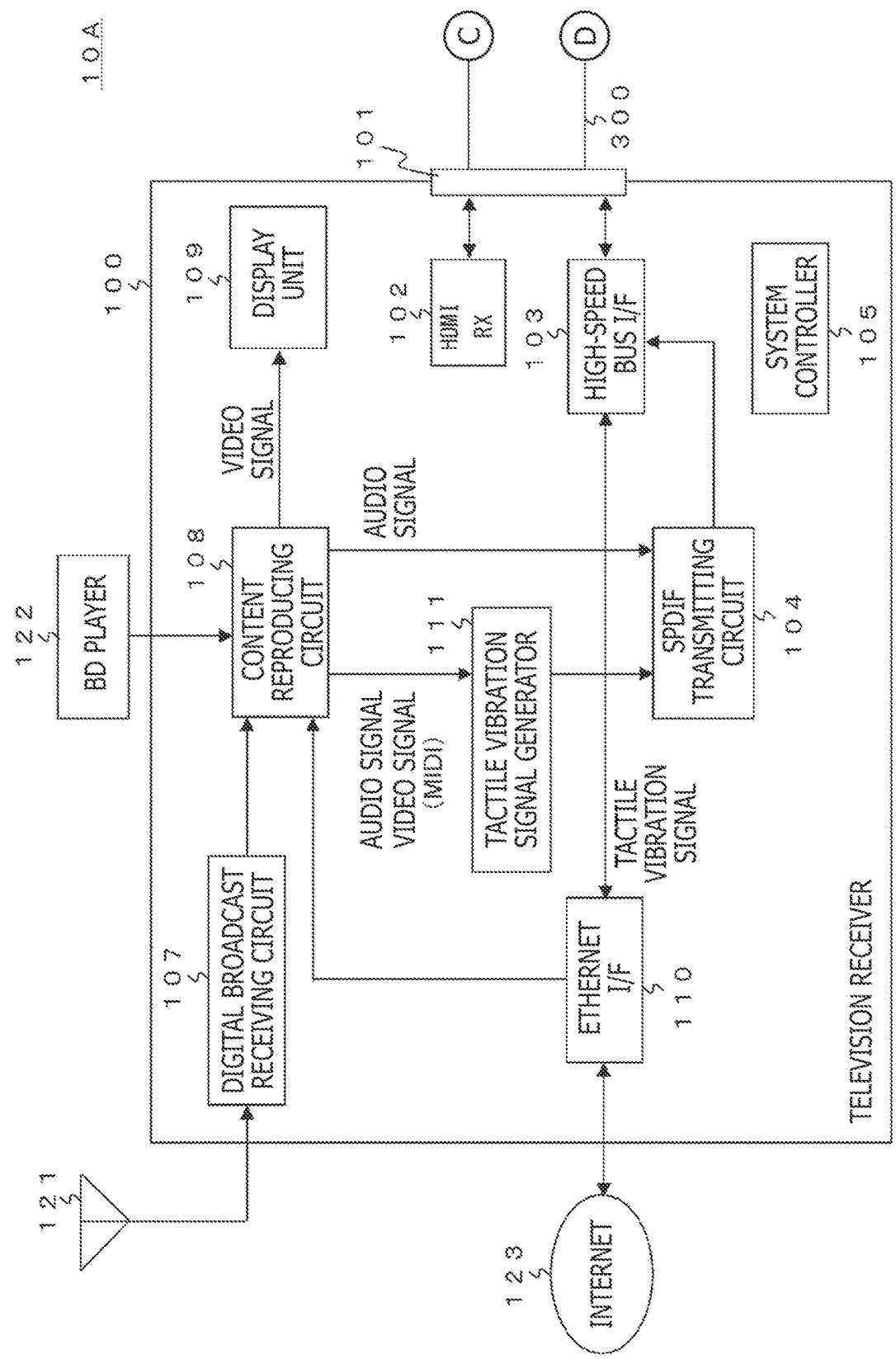
FIG. 21 depicts block diagrams illustrating another configuration example of the AV system.
Figure 21B:
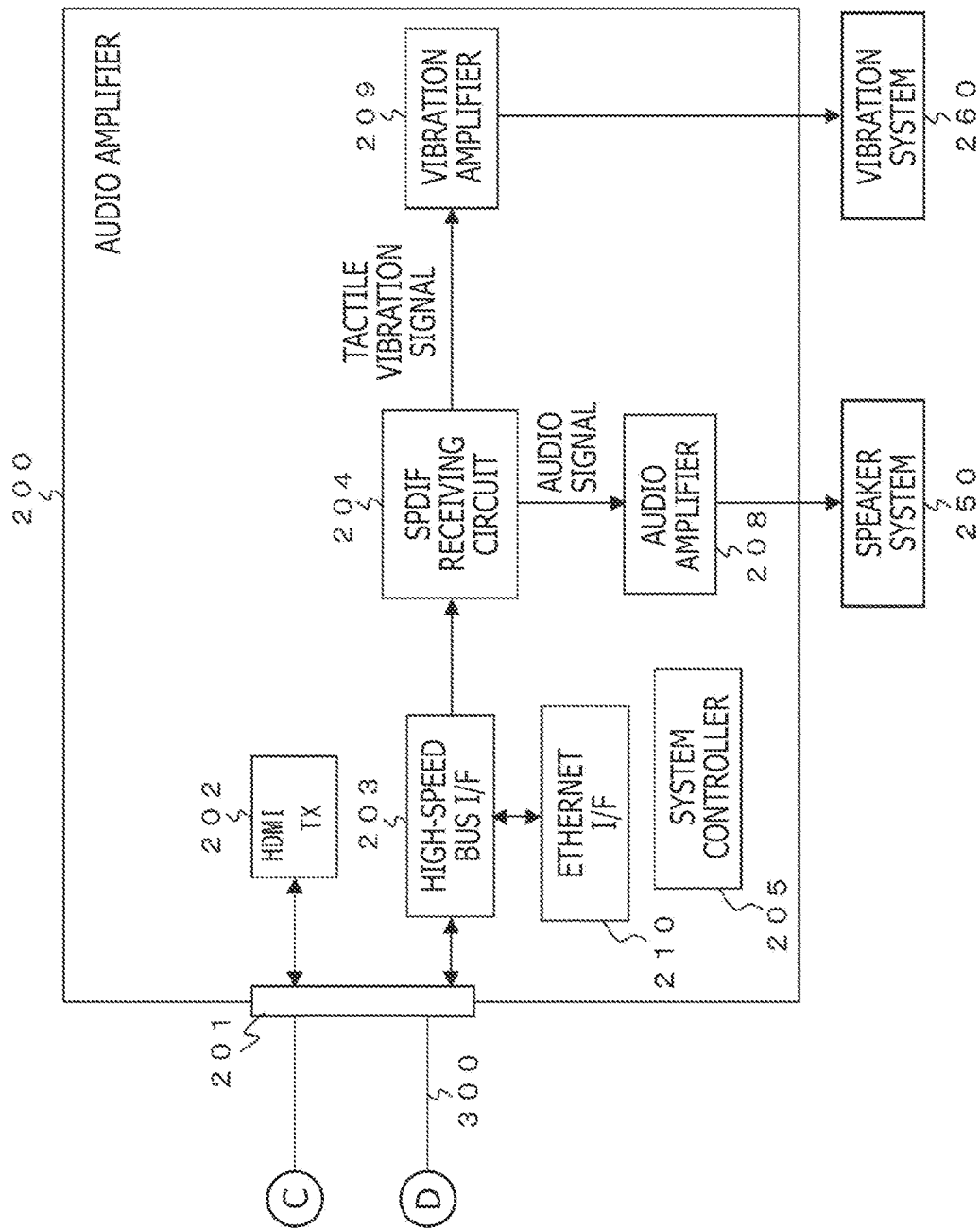

FIG. 21 illustrates a configuration example of an AV system 10A in that case. In FIG. 21, portions having their counterparts in FIG. 1 are given identical reference characters, and detailed explanations thereof are omitted as appropriate. The television receiver 100 further has a tactile vibration signal generating section 111. The tactile vibration signal generating section 111 analyzes audio signals and video signals input from the content reproduction circuit 108 to generate tactile vibration signals and supplies the tactile vibration signals to the SPDIF transmission circuit 104. In other respects, the television receiver 100 has configurations similar to those of the television receiver 100 of the AV system 10 illustrated in FIG. 1.

Note that, in a case where content includes vibration instruction signals like those generated by a MIDI (Musical Instrument Digital Interface), for example, the tactile vibration signal generating section 111 may generate tactile vibration signal on the basis of those vibration instruction signals.

Figure 22:
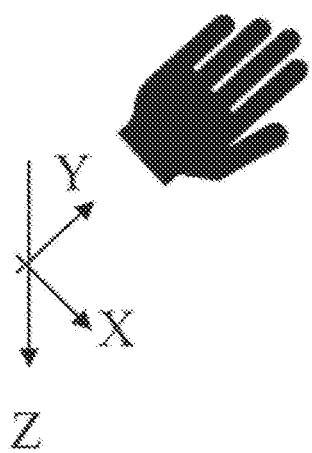
FIG. 22 is a figure for explaining X axis, Y axis, and Z axis vibration data included in a tactile vibration signal.
Figure 23:
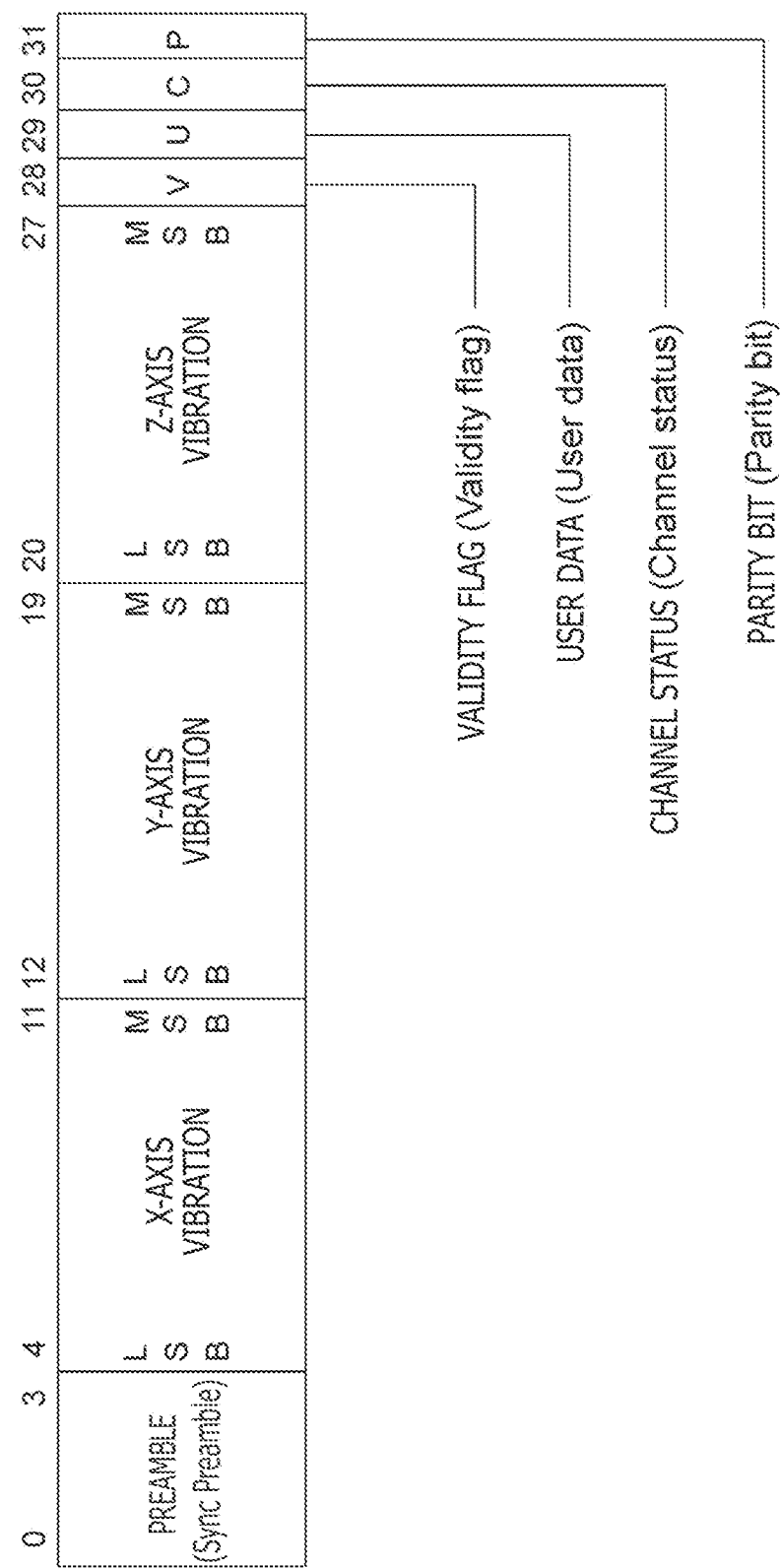
FIG. 23 is a figure for explaining that the X axis, Y axis, and Z axis vibration data included in the tactile vibration signal is assigned to 24 bit slots in a subframe according to IEC 60958-1.

In addition, although not mentioned above, tactile vibration signals themselves may be multi-dimensional signals. For example, in a case where vibration data of the X axis, the Y axis, and the Z axis included in a tactile vibration signal (see FIG. 22) is to be transferred, each piece of data is digitized as eight-bit data, and can be transferred by assigning the data to 24 bit slots in a subframe according to IEC 60958-1 as illustrated in FIG. 23. 24 bits in total from the bit 4 to the bit 27 in the subframe are used for an audio channel transfer in the linear PCM, and the bits are used by being divided into three sets of eight bits. Note that, for example, the Z axis is defined as being perpendicular to a skin, and the X axis and the Y axis are defined as being parallel to the skin. Furthermore, it may be possible to weight bit allocations, and bits may be allocated non-uniformly, for example, ten bits to the Z axis and seven bits to each of the X axis and the Y axis.

In a case where 24 bit slots are used by being divided into three as illustrated in FIG. 23, even if a device that is used drives only along the Z axis, certain bits, i.e., lower bits in the 24-bit data, are treated as noises, and driving can be performed in a manner compatible with the case of one-dimensional driving. In addition, in this case, it is possible to divide the 24 bit slots such that a channel is allocated to each finger or smaller contact surfaces are formed.

Figure 24:
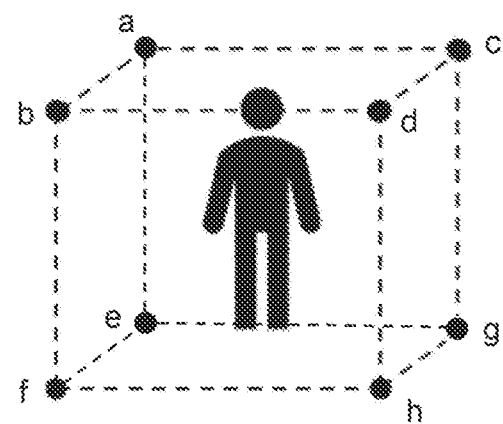
FIG. 24 is a figure for explaining a case where a tactile vibration signal for each vertex of an imaginary cubic space covering a user is representatively transmitted.

In addition, although not mentioned above, as illustrated in FIG. 24, a tactile vibration signal for each of vertices a to h of an imaginary cubic space covering a user may be representatively transmitted, and a tactile vibration signal at an actual drive point included in the cubic space may be determined by linear interpolation or the like from the tactile vibration signal for each vertex. The signal name of a tactile vibration signal of each vertex in this case may be front upper right corner, rear lower left corner or the like.

In addition, although not mentioned above, if equipment that is used supports recording and reproduction of signals in the multichannel transfer format illustrated in FIG. 12, signals in the multichannel transfer format including multi-channel audio signals and a predetermined number of channels of tactile vibration signals illustrated in FIG. 18 can similarly be recorded and reproduced.

In addition, tactile vibration signals are transferred simultaneously with audio signals in the example illustrated in the embodiment mentioned above. Similarly, the present technique can be applied also to a case where various types of sensor signal are packed in utterance-supporting robotics machine control signals or audio microphone signals and transferred simultaneously. In addition, the present technique can be applied also to a bulk synchronized transfer for car engine sounds, temperature sensor data, and the like.

Note that, although the HDMI ARC is used as the IEC 60958 transfer line in the example illustrated in the embodiment mentioned above, a coaxial cable or an optical cable is used as the IEC 60958 transfer line in one possible example. In addition, an HDMI transfer line may be used as the IEC 60958 transfer line in another possible example. In this case, SPDIF signals (IEC 60958 signals) are mapped in audio sample packets (audio sample packets) and transferred in the forward direction which is the same as the direction of a video transfer. Similarly, an IEC 61883-6 transfer line, an MHL transfer line, a display port transfer line (DP transfer line), or the like may be used as the IEC 60958 transfer line in still another possible example. In these cases also, SPDIF signals (IEC 60958 signals) are mapped in audio sample packets (audio sample packets) and transferred in the forward direction which is the same as the direction of a video transfer.

In addition, although the suitable embodiment of the present disclosure is explained in detail while referring to the attached drawings, the technical scope of the present disclosure is not limited to those examples. It is apparent that those with ordinary knowledge in the technical field of the present disclosure can conceive of various types of modified example or corrected example within the scope of the technical idea described in claims, and it is understood that the various types of modified example or corrected example also belong to the technical scope of the present disclosure certainly.

In addition, the technique can have configurations like the ones mentioned below.

(1) A transmitting apparatus including:
a transmitting section that sequentially transmits transfer signals for respective blocks each including a plurality of frames to a receiver side via a predetermined transfer line, in which
the transfer signals include a predetermined number of channels of audio signals and a predetermined number of channels of tactile vibration signals.

(2) The transmitting apparatus according to (1), further including:
an information adding section that adds, to the transfer signals, configuration information of the predetermined number of channels of audio signals and the predetermined number of channels of tactile vibration signals.

(3) The transmitting apparatus according to (2), in which the configuration information includes identification information for distinguishing the tactile vibration signals from the audio signals.

(4) The transmitting apparatus according to (3), in which the identification information includes information of a vibration position targeted by each of the predetermined number of channels of tactile vibration signals.

(5) The transmitting apparatus according to any of (2) to (4), in which the information adding section adds the configuration information by using a predetermined channel-status bit area formed for each of the blocks.

(6) The transmitting apparatus according to any of (2) to (5), in which the information adding section adds the configuration information by using user data bits of a predetermined number of consecutive frames.

(7) The transmitting apparatus according to any of (1) to (6), in which
the plurality of frames includes repetitions of multichannel groups each including a predetermined number of frames, and
the transmitting section transmits the predetermined number of channels of audio signals and the predetermined number of channels of tactile vibration signals in a state that the predetermined number of channels of audio signals and the predetermined number of channels of tactile vibration signals are arranged in a time-division manner separately for each channel in all or some of the predetermined number of frames in each of the multichannel groups.

(8) The transmitting apparatus according to any of (1) to (7), further including:
a processing section that generates the tactile vibration signals on the basis of media signals associated with the audio signals.

(9) The transmitting apparatus according to any of (1) to (8), in which transmitting apparatus the predetermined transfer line is a coaxial cable, an optical cable, an Ethernet (IEC 61883-6) cable, an HDMI cable, an MHL cable, or a display port cable.

(10) A transmission method including:
a procedure of sequentially transmitting transfer signals for respective blocks each including a plurality of frames to a receiver side via a predetermined transfer line, in which
the transfer signals include a predetermined number of channels of audio signals and a predetermined number of channels of tactile vibration signals.

(11) A receiving apparatus including:
a receiving section that sequentially receives transfer signals for respective blocks each including a plurality of frames from a transmitter side via a predetermined transfer line, in which
the transfer signals include a predetermined number of channels of audio signals and a predetermined number of channels of tactile vibration signals.

(12) The receiving apparatus according to (11), further including:
a processing section that processes the transfer signals and outputs the predetermined number of channels of audio signals and the predetermined number of channels of tactile vibration signals.

(13) The receiving apparatus according to (12), in which the transfer signals include configuration information of the predetermined number of channels of audio signals and the predetermined number of channels of tactile vibration signals, and the processing section processes the transfer signals on the basis of the configuration information and outputs the predetermined number of channels of audio signals and the predetermined number of channels of tactile vibration signals.

(14) The receiving apparatus according to (13), in which the configuration information is added by using a predetermined channel-status bit area formed for each of the blocks.

(15) The receiving apparatus according to (13) or (14), in which the configuration information is added by using user data bits of a predetermined number of consecutive frames.

(16) The receiving apparatus according to any of (11) to (15), in which
the plurality of frames includes repetitions of multichannel groups each including a predetermined number of frames, and
the predetermined number of channels of audio signals and the predetermined number of channels of tactile vibration signals are arranged in a time-division manner separately for each channel in all or some of the predetermined number of frames in each of the multichannel groups.

(17) The receiving apparatus according to any of (11) to (16), in which the predetermined transfer line is a coaxial cable, an optical cable, an Ethernet (IEC 61883-6) cable, an HDMI cable, an MHL cable or a display port cable.

(18) A reception method including:
a procedure of sequentially receiving transfer signals for respective blocks each including a plurality of frames from a transmitter side via a predetermined transfer line, in which
the transfer signals include a predetermined number of channels of audio signals and a predetermined number of channels of tactile vibration signals.

REFERENCE SIGNS LIST 10, 10A: AV system
100: Television receiver
101: HDMI terminal
102: HDMI receiving section
103: High-speed bus interface
104: SPDIF transmission circuit
105: System controller
107: Digital broadcast reception circuit
108: Content reproduction circuit
109: Display section
110: Ethernet interface
111: Tactile vibration signal generating section
121: Reception antenna
122: BD player
123: Internet
200: Audio amplifier
201: HDMI terminal
202: HDMI transmitting section
203: High-speed bus interface
204: SPDIF reception circuit
205: System controller
208: Audio amplifier
209: Vibration amplifier
210: Ethernet interface
250: Speaker system
260: Vibration system
300: HDMI cable

The invention claimed is:

1. A transmitting apparatus comprising:
a transmitting section configured to sequentially transmit transfer signals for respective blocks each including a plurality of frames to a receiver side via a predetermined transfer line,
wherein the transfer signals include a predetermined number of channels of audio signals and a predetermined number of channels of tactile vibration signals,
wherein the predetermined number of channels of audio signals are identified using a first channel-status bit area within a respective block of the transfer signals and the predetermined number of channels of tactile vibration signals are identified using a second channel-status bit area within the respective block of the transfer signals, and
wherein the transmitting section is implemented via at least one processor.

2. The transmitting apparatus according to claim 1, further comprising:
an information adding section configured to add, to the transfer signals, configuration information of the predetermined number of channels of audio signals and the predetermined number of channels of tactile vibration signals,
wherein the information adding section is implemented via at least one processor.

3. The transmitting apparatus according to claim 2,
wherein the configuration information includes identification information for distinguishing the tactile vibration signals from the audio signals.

4. The transmitting apparatus according to claim 3,
wherein the identification information includes information of a vibration position targeted by each of the predetermined number of channels of tactile vibration signals.

5. The transmitting apparatus according to claim 2,
wherein the information adding section adds the configuration information by using a third channel-status bit area formed for each of the blocks.

6. The transmitting apparatus according to claim 2,
wherein the information adding section adds the configuration information by using user data bits of a predetermined number of consecutive frames.

7. The transmitting apparatus according to claim 1, wherein
the plurality of frames includes repetitions of multichannel groups each including a predetermined number of frames, and
the transmitting section transmits the predetermined number of channels of audio signals and the predetermined number of channels of tactile vibration signals in a state that the predetermined number of channels of audio signals and the predetermined number of channels of tactile vibration signals are arranged in a time-division manner separately for each channel in all or some of the predetermined number of frames in each of the multichannel groups.

8. The transmitting apparatus according to claim 1, further comprising:
a processing section configured to generate the tactile vibration signals based on media signals associated with the audio signals,
wherein the processing section is implemented via at least one processor.

9. The transmitting apparatus according to claim 1, wherein the predetermined transfer line is a coaxial cable, an optical cable, an Ethernet (IEC 61883-6) cable, an HDMI cable, an MHL cable, or a display port cable.

10. A transmission method comprising:
sequentially transmitting transfer signals for respective blocks each including a plurality of frames to a receiver side via a predetermined transfer line,
wherein the transfer signals include a predetermined number of channels of audio signals and a predetermined number of channels of tactile vibration signals, and
wherein the predetermined number of channels of audio signals are identified using a first channel-status bit area within a respective block of the transfer signals and the predetermined number of channels of tactile vibration signals are identified using a second channel-status bit area within the respective block of the transfer signals.

11. A receiving apparatus comprising:
a receiving section that sequentially receives transfer signals for respective blocks each including a plurality of frames from a transmitter side via a predetermined transfer line,
wherein the transfer signals include a predetermined number of channels of audio signals and a predetermined number of channels of tactile vibration signals, and
wherein the predetermined number of channels of audio signals are identified using a first channel-status bit area within a respective block of the transfer signals and the predetermined number of channels of tactile vibration signals are identified using a second channel-status bit area within the respective block of the transfer signals.

12. The receiving apparatus according to claim 11, further comprising:
a processing section that processes the transfer signals and outputs the predetermined number of channels of audio signals and the predetermined number of channels of tactile vibration signals.

13. The receiving apparatus according to claim 12, wherein
the transfer signals include configuration information of the predetermined number of channels of audio signals and the predetermined number of channels of tactile vibration signals, and
the processing section processes the transfer signals based on the configuration information and outputs the predetermined number of channels of audio signals and the predetermined number of channels of tactile vibration signals.

14. The receiving apparatus according to claim 13,
wherein the configuration information is added by using a third channel-status bit area formed for each of the blocks.

15. The receiving apparatus according to claim 13,
wherein the configuration information is added by using user data bits of a predetermined number of consecutive frames.

16. The receiving apparatus according to claim 11, wherein
the plurality of frames includes repetitions of multichannel groups each including a predetermined number of frames, and
the predetermined number of channels of audio signals and the predetermined number of channels of tactile vibration signals are arranged in a time-division manner separately for each channel in all or some of the predetermined number of frames in each of the multichannel groups.

17. The receiving apparatus according to claim 11,
wherein the predetermined transfer line is a coaxial cable, an optical cable, an Ethernet (IEC 61883-6) cable, an HDMI cable, an MHL cable, or a display port cable.

18. A reception method comprising:
sequentially receiving transfer signals for respective blocks each including a plurality of frames from a transmitter side via a predetermined transfer line,
wherein the transfer signals include a predetermined number of channels of audio signals and a predetermined number of channels of tactile vibration signals, and
wherein the predetermined number of channels of audio signals are identified using a first channel-status bit area within a respective block of the transfer signals and the predetermined number of channels of tactile vibration signals are identified using a second channel-status bit area within the respective block of the transfer signals.

\* \* \* \* \*